US012406291B2

(12) United States Patent
Shahrasbi et al.

(10) Patent No.: US 12,406,291 B2
(45) Date of Patent: Sep. 2, 2025

(54) SIMILAR ITEM RECOMMENDATION FRAMEWORK USING WIDE-AND-DEEP-ARCHITECTURE

(71) Applicant: Walmart Apollo, LLC, Bentonville, AR (US)

(72) Inventors: Behzad Shahrasbi, Santa Clara, CA (US); Sriram Guna Sekhar Kollipara, Sunnyvale, CA (US); Jianpeng Xu, San Jose, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 786 days.

(21) Appl. No.: 17/589,855

(22) Filed: Jan. 31, 2022

(65) Prior Publication Data

US 2022/0230226 A1 Jul. 21, 2022

Related U.S. Application Data

(63) Continuation-in-part of application No. 16/722,467, filed on Dec. 20, 2019, now Pat. No. 11,455,655.

(51) Int. Cl.
*G06Q 30/0601* (2023.01)
*G06N 3/08* (2023.01)

(52) U.S. Cl.
CPC .......... *G06Q 30/0631* (2013.01); *G06N 3/08* (2013.01); *G06Q 30/0603* (2013.01)

(58) Field of Classification Search
CPC ...... G06Q 10/00; G06Q 50/01; G06F 16/901; G06F 18/24137
See application file for complete search history.

(56) References Cited

U.S. PATENT DOCUMENTS

| 6,029,141 | A  | 2/2000 | Bezos et al. |
| 6,266,649 | B1 | 7/2001 | Linden |
| 7,558,787 | B2 | 7/2009 | Parikh |

(Continued)

OTHER PUBLICATIONS

Contextual searching, from Wikipedia, dated Sep. 27, 2018, from https://en.wikipedia.org/w/index.php?title=Contextual_searching@oldid=861390169, downloaded Jan. 20, 2022 Sep. 27, 2018.

(Continued)

*Primary Examiner* — Saba Dagnew
(74) *Attorney, Agent, or Firm* — Foley & Lardner LLP

(57) ABSTRACT

A system including one or more processors and one or more non-transitory computer-readable media storing computing instructions that, when executed on the one or more processors, cause the one or more processors to perform functions comprising: receiving one or more vectors representing one or more types of features for a pair of items; generating, using a similarity item model of a machine learning architecture, a prediction for a similar item, wherein the similarity item model combines a pair of separately trained machine learning models; combining a first output of the gradient boosted model and a second output of the neural network model to generate a similarity score for the pair of items; and transmitting the similar item to a first position on a carousel display of a website that concurrently displays the anchor item on the website. Other embodiments are disclosed.

20 Claims, 13 Drawing Sheets

(56) References Cited

U.S. PATENT DOCUMENTS

| | | | |
|---|---|---|---|
| 8,019,642 | B2 | 9/2011 | Selinger et al. |
| 8,108,329 | B2 | 1/2012 | Selinger et al. |
| 8,117,216 | B1 | 2/2012 | Chanda et al. |
| 8,364,528 | B2 | 1/2013 | Selinger et al. |
| 8,392,429 | B1 | 3/2013 | Clancy et al. |
| 8,473,349 | B1 | 6/2013 | Manber et al. |
| 8,554,629 | B2 | 10/2013 | Barton et al. |
| 8,615,442 | B1 | 12/2013 | Kapur et al. |
| 8,924,265 | B2 | 12/2014 | Selinger et al. |
| 9,009,154 | B2 | 4/2015 | Rinckes et al. |
| 9,734,503 | B1 | 8/2017 | Gargi |
| 10,007,946 | B1 | 6/2018 | Levy et al. |
| 10,318,993 | B2 | 6/2019 | Baghaie et al. |
| 10,521,831 | B2 | 12/2019 | Putrevu et al. |
| 10,706,450 | B1 | 7/2020 | Tavemier |
| 10,902,341 | B1 | 1/2021 | Qureshi |
| 11,580,447 | B1 * | 2/2023 | Yates ..................... G06Q 50/01 |
| 2005/0222987 | A1 | 10/2005 | Vadon |
| 2007/0038614 | A1 | 2/2007 | Guha |
| 2007/0083611 | A1 | 4/2007 | Farago et al. |
| 2007/0240207 | A1 | 10/2007 | Belakhdar et al. |
| 2008/0235085 | A1 | 9/2008 | Kovinsky et al. |
| 2008/0243816 | A1 | 10/2008 | Chan et al. |
| 2009/0228277 | A1 | 9/2009 | Bonforte et al. |
| 2009/0259632 | A1 | 10/2009 | Singh |
| 2010/0138452 | A1 | 6/2010 | Henkin et al. |
| 2011/0078127 | A1 | 3/2011 | Lin et al. |
| 2011/0238478 | A1 | 9/2011 | Gottfurcht et al. |
| 2012/0012406 | A1 | 1/2012 | Stoicoviciu |
| 2012/0296900 | A1 * | 11/2012 | Kalai ..................... G06Q 10/00 707/E17.019 |
| 2013/0166303 | A1 | 6/2013 | Chang et al. |
| 2013/0211879 | A1 | 8/2013 | Holland |
| 2013/0211925 | A1 | 8/2013 | Holland |
| 2013/0290117 | A1 | 10/2013 | Urban |
| 2013/0315475 | A1 | 11/2013 | Song et al. |
| 2014/0180790 | A1 | 6/2014 | Boal |
| 2014/0180793 | A1 | 6/2014 | Boal |
| 2014/0180802 | A1 | 6/2014 | Boal |
| 2014/0180806 | A1 | 6/2014 | Boal |
| 2014/0180807 | A1 | 6/2014 | Boal |
| 2014/0180808 | A1 | 6/2014 | Boal |
| 2014/0180809 | A1 | 6/2014 | Boal |
| 2014/0180810 | A1 | 6/2014 | Boal |
| 2014/0180811 | A1 | 6/2014 | Boal |
| 2016/0225015 | A1 | 8/2016 | Subramanya et al. |
| 2017/0090867 | A1 | 3/2017 | Lifar et al. |
| 2017/0097490 | A1 | 4/2017 | Chen et al. |
| 2017/0097940 | A1 | 4/2017 | Panuganty |
| 2017/0262899 | A1 | 9/2017 | Geraghty et al. |
| 2018/0060908 | A1 | 3/2018 | Kenthapadi |
| 2018/0075512 | A1 | 3/2018 | Bui et al. |
| 2018/0218428 | A1 | 8/2018 | Xie et al. |
| 2019/0034412 | A1 | 1/2019 | Gupta et al. |
| 2019/0073581 | A1 * | 3/2019 | Chen ..................... G06N 3/045 |
| 2019/0163758 | A1 | 5/2019 | Zhivotvorev et al. |
| 2019/0266285 | A1 | 8/2019 | Wang et al. |
| 2019/0279105 | A1 * | 9/2019 | Arel ..................... G06F 18/24137 |
| 2019/0311301 | A1 * | 10/2019 | Pyati ..................... G06F 16/901 |
| 2019/0347347 | A1 | 11/2019 | Griffith |
| 2020/0005347 | A1 | 1/2020 | Boal |
| 2020/0104898 | A1 | 4/2020 | Cui et al. |
| 2020/0285944 | A1 | 9/2020 | Lee et al. |
| 2021/0012406 | A1 | 1/2021 | Wadhwa et al. |
| 2021/0073891 | A1 | 3/2021 | Al Jadda et al. |

OTHER PUBLICATIONS

Maruti Techlabs, What are Product Recommendation Engines? And the various versions of them?, dated Sep. 28, 2017, downloaded Oct. 8, 2021 from https://towardsdatascience.com/what-are-product-recommendation-engines-and-the-various-versions-of-them-9dcab43326d5 (Year: 2017) Sep. 28, 2017.

Brownlee, Jason, "What Are Word Embeddings for Text?", dated Oct. 11, 2017, downloaded Jul. 2, 2021 from https://machinelearningmastery.com/what-are-word-embeddings/ Oct. 11, 2017.

Karani, Dhruvil, "Introduction to Word Embeddings and Word2Vec," dated Sep. 1, 2018, downaloded Jul. 2, 2021 from https://towardsdatascience.com/introduction-to-word-embedding-and-word2vec-652d0c2060fa Sep. 1, 2018.

Deng, Houlao, "Recommender Systems in Practice—How Companies Make Product Recommendations," dated Feb. 13, 2019, downloaded Jul. 2, 2021 from https://towardsdatascience.com/recommender-systems-in-practice-cef9033bb23a Feb. 13, 2019.

Foote, Keith D., "A Brief History of Machine Learning," dated Mar. 26, 2019, downloaded from https://www.dataversity.net/a-brief-history-of-machine-learing/# on Apr. 13, 2021 Mar. 26, 2019.

Recommendations AI, Google Cloud [online], retrieved from https://web.archive.org/web/20190419050729/https://cloud.google.com/recommendations/, via the WayBack Machine at Archive.org on Oct. 6, 2023, dated Apr. 19, 2019 Apr. 19, 2019.

Jorge Martinez-Gil, An overview of textual semantic similarity measures based on web intelligence, Artificial Intelligence Review, Springer Verlag, 2012, 42(4), pp. 935-943 (10.1007/s10462-012-9349-/. hal001630890) dated 2012, downloaded from https://hal.archives-ouvertes.fr/hal-01630890/document (Year: 2012) 2012.

Nayak, Pandu, Understanding searches better than ever before, from blog.google, dated Oct. 25, 2019, downloaded Oct. 31, 2022 from https://blog.google/products/search/search-language-understanding-bert/ Oct. 25, 2019.

Slawski, Bill, How a Search Engine Might Determine Search Engine Relevance from Related Queries, SEO by the Sea.com, dated Jul. 22, 2009, downloaded Oct. 31, 2022 from https://www.seobythesea.com/2009/07/how-a-search-engine-might-determine-the-relevance-of-search-results-from-related-queries/ Jul. 22, 2009.

* cited by examiner

SIMILAR ITEM RECOMMENDATION FRAMEWORK USING WIDE-AND-DEEP-ARCHITECTURE

CROSS-REFERENCE TO RELATED APPLICATIONS

This application is a continuation-in-part of U.S. application Ser. No. 16/722,467, filed Dec. 20, 2019 and is incorporated herein by reference in its entirety.

TECHNICAL FIELD

The disclosure relates generally to similar item recommendation frameworks using wide-and-deep-architecture.

BACKGROUND

At least some websites, such as retailer websites, display item advertisements. The item advertisements may include an image of an item, and a price of the item. For example, a website may display item advertisements, and may further allow a customer to purchase the advertised items. The displayed advertisements may be determined by advertisement recommendation systems, which attempt to provide advertisements for items which customers may be interested in. In some examples, however, the advertisement recommendation systems provide advertisements for items that are irrelevant to the customer, or for items the customer is not interested in.

As a result, a retailer may lose sales of items to a customer. For example, the customer may not buy the advertised item. In addition, the customer may leave the website without having purchased an item that, if shown an advertisement for, the customer would have purchased. In some examples, if a customer perceives an advertisement as irrelevant, the customer may go elsewhere, such as another website, to make purchases. As such, there are opportunities to address advertisement recommendation systems.

SUMMARY

The embodiments described herein are directed to automatically determining and providing digital item advertisements that may be displayed, for example, on a website. The embodiments may allow a person, such as a customer, to be presented with advertisements that may be more relevant to (e.g., likely to interest) the person. For example, the embodiments may allow the person to view advertisements that the person may be more willing to purchase. As such, the embodiments may allow a retailer to increase item advertisement conversions (e.g., an amount of advertised items sold). In addition, because a person may now spend less time reviewing irrelevant advertisements, the person may have additional time to consider additional items for purchase. In addition to or instead of these example advantages, persons of ordinary skill in the art having the benefit of these disclosures may recognize and appreciate other advantages as well.

In accordance with various embodiments, exemplary systems may be implemented in any suitable hardware or hardware and software, such as in any suitable computing device. For example, in some embodiments, a computing device generates feature data based on historical website interaction data, historical transaction data, and item categorical data. The computing device trains each of a plurality of machine learning models based on the generated feature data. The computing device may then receive a plurality of recommended items to advertise in association with an anchor item. The computing device may execute the trained machine learning process to generate prediction data associated with a future time period. The prediction data may identify a number of times each recommended item may be purchased during the future time period. The computing device may then rank the plurality of recommended items based on the prediction data. In some examples, the computing device filters the plurality of recommended items based on item categories.

In some embodiments, a computing device is configured to receive, for an anchor item, a plurality of recommended items. The computing device may be configured to generate, for each recommended item of the plurality of recommended items, features based on session activity data. Further, the computing device may be configured to execute a trained machine learning process based on the generated features for each of the plurality of recommended items. The computing device may also be configured to generate prediction data for each of the recommended items based on the execution of the trained machine learning process. The computing device may be configured to generate a ranking of the plurality of recommended items based on the prediction data. In some examples, the computing device may be configured to transmit the ranking of the plurality of recommended items. For example, the computing device may transmit the ranking of the plurality of recommended items to a web server, where the web server displays one or more of the item advertisements in ranked order.

In some examples, the computing device is configured to generate categorical attribute embeddings based on the session activity data, and filter the ranking of the plurality of recommended items based on the categorical attribute embeddings.

In some embodiments, a method is provided that includes receiving, for an anchor item, a plurality of recommended items. The method also includes generating, for each recommended item of the plurality of recommended items, features based on session activity data. The method may also include executing a trained machine learning process based on the generated features for each of the plurality of recommended items. Further, the method may include generating prediction data for each of the recommended items based on the execution of the trained machine learning process. The method may also include generating a ranking of the plurality of recommended items based on the prediction data. In some examples, the method may include transmitting the ranking of the plurality of recommended items.

In some examples, the method includes generating categorical attribute embeddings based on the session activity data, and filtering the ranking of the plurality of recommended items based on the categorical attribute embeddings.

In yet other embodiments, a non-transitory computer readable medium has instructions stored thereon, where the instructions, when executed by at least one processor, cause a computing device to perform operations that include receiving, for an anchor item, a plurality of recommended items. The operations may also include generating, for each recommended item of the plurality of recommended items, features based on session activity data. The operations may also include executing a trained machine learning process based on the generated features for each of the plurality of recommended items. Further, the operations may include generating prediction data for each of the recommended items based on the execution of the trained machine learning process. The operations may also include generating a ranking of the plurality of recommended items based on the prediction data. In some examples, the operations may include transmitting the ranking of the plurality of recommended items.

In some examples, the operations include generating categorical attribute embeddings based on the session activity data, and filtering the ranking of the plurality of recommended items based on the categorical attribute embeddings.

Various embodiments can include a system can comprise one or more processors and one or more non-transitory computer-readable media storing computing instructions that, when executed on the one or more processors, cause the one or more processors to perform certain functions. The functions can include receiving one or more vectors representing one or more types of features for a pair of items. The pair of items can include an anchor item and a similar item. The functions also can include generating, using a similarity item model of a machine learning architecture, a prediction for a similar item. The similarity item model can combine a pair of separately trained machine learning models. The pair of separately trained machine learning models can include a gradient boosted model and a neural network model. The functions can further include combining a first output of the gradient boosted model and a second output of the neural network model to generate a similarity score for the pair of items. Based on a ranking of the similarity score, the functions can include transmitting the similar item to a first position on a carousel display of a website that concurrently displays the anchor item on the web site.

A number of embodiments can include a method being implemented via execution of computing instructions configured to run on one or more processors and stored at one or more non-transitory computer-readable media. The method can include receiving one or more vectors representing one or more types of features for a pair of items. The pair of items can include an anchor item and a similar item. The method also can include generating, using a similarity item model of a machine learning architecture, a prediction for a similar item. The similarity item model can combine a pair of separately trained machine learning models. The pair of separately trained machine learning models can include a gradient boosted model and a neural network model. The method can further include combining a first output of the gradient boosted model and a second output of the neural network model to generate a similarity score for the pair of items. Based on a ranking of the similarity score, the method can include transmitting the similar item to a first position on a carousel display of a website that concurrently displays the anchor item on the website.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
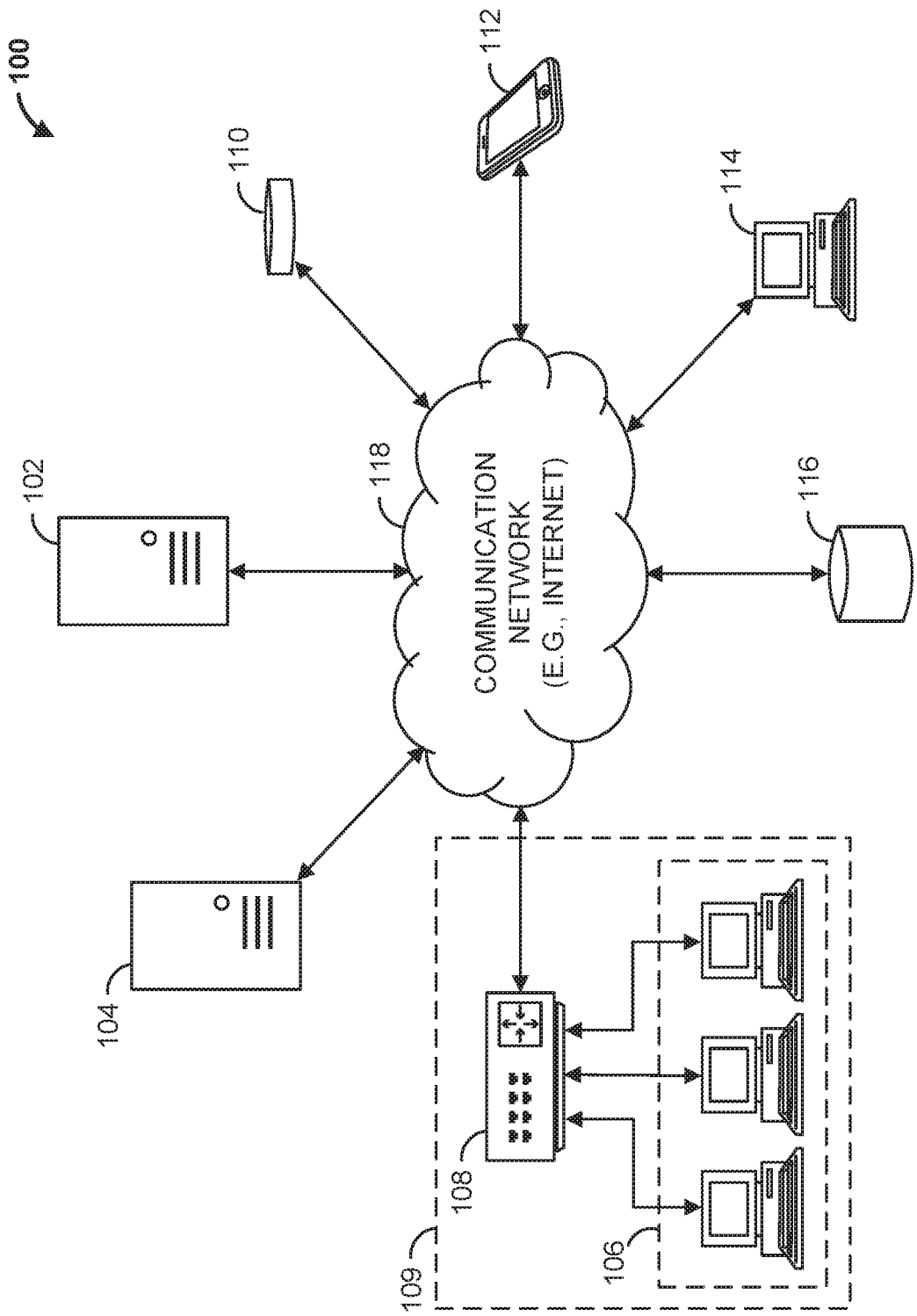
FIG. 1 is a block diagram of a digital advertisement recommendation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital advertisement recommendation system 100 that includes an advertisement recommendation computing device 102 (e.g., a server, such as an application server), a web server 104, workstation(s) 106, database 116, and multiple customer computing devices 110, 112, 114 operatively coupled over network 118. Advertisement recommendation computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, advertisement recommendation computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, advertisement recommendation computing device 102 is operated by a retailer, and multiple customer computing devices 112, 114 are operated by customers of the retailer.

Although FIG. 1 illustrates three customer computing devices 110, 112, 114, digital advertisement recommendation system 100 can include any number of customer computing devices 110, 112, 114. Similarly, digital advertisement recommendation system 100 can include any number of workstation(s) 106, advertisement recommendation computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with advertisement recommendation computing device 102 over communication network 118. The workstation(s) 106 may send data to, and receive data from, advertisement recommendation computing device 102. For example, the workstation(s) 106 may transmit data related to an order purchased by a customer at store 109 to advertisement recommendation computing device 102. In response, advertisement recommendation computing device 102 may transmit an indication of one or more item advertisements to provide to the purchasing customer. For example, the item advertisements may be displayed on a receipt handed to the customer for the purchase order.

In some examples, web server 104 may host one or more web pages, such as a retailer's website. The website may allow a customer to purchase items. For example, the website may display advertisements for items that a customer may purchase on the website. In some examples, advertisement recommendation computing device 102 may transmit one or more item advertisements to display on the website. For example, the item advertisements may be displayed on a checkout webpage, on a homepage, on an item webpage, or on a webpage dedicated to a category of the advertised item, such as when a customer is browsing that webpage.

In some examples, web server 104 transmits user session data and/or purchase order data for customers viewing webpages hosted by web server 104 to advertisement recommendation computing device 102. Advertisement recommendation computing device 102 may train one or more machine learning processes to determine item advertisements based on the user session data and/or purchase order data.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a web site hosted by web server 104. In some examples, web server 104 hosts a website for a retailer that allows for the purchase of items. An operator of one of multiple computing devices 110, 112, 114 may access the web site hosted by web server 104, add one or more items to an online shopping cart of the web site, and perform an online checkout of the shopping cart to purchase the items.

Advertisement recommendation computing device 102 is operable to communicate with database 116 over communication network 118. For example, advertisement recommendation computing device 102 can store data to, and read data from, database 116. Database 116 can be a remote storage device, such as a cloud-based server, a memory device on another application server, a networked computer, or any other suitable remote storage. Although shown remote to advertisement recommendation computing device 102, in some examples, database 116 can be a local storage device, such as a hard drive, a non-volatile memory, or a USB stick.

Communication network 118 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Advertisement recommendation computing device 102 can determine item advertisements to be displayed on a webpage, such as one hosted by web server 104. To determine the item advertisements, advertisement recommendation computing device 102 may train one or more machine learning processes (e.g., algorithms). To train the machine learning processes, advertisement recommendation computing device 102 may obtain data identifying a plurality of anchor item and candidate recommended item pairs. An anchor item may be, for example, an item a customer is viewing on a webpage. A candidate recommended item may be an item for which an advertisement may be displayed. An advertisement for the candidate recommended item may be displayed, for example, while a user is browsing a webpage dedicated to the anchor item, or on a webpage illustrating that the anchor item has been added to an online shopping cart (e.g., checkout webpage), for example.

For each anchor item and candidate recommended item pair, advertisement recommendation computing device 102 may generate interaction data. Advertisement recommendation computing device 102 may generate interaction data based on obtained user session data for a plurality of users. For example, the user session data may identify items viewed, engaged (e.g., clicked on), or purchased on a website, such as a website hosted by web server 104. User session data may also identify, for example, item advertisement impressions, items added to an online shopping cart, or items purchased after an engagement on the website of an advertisement for the items. User session data may also identify any other data related to the browsing of a website.

Advertisement recommendation computing device 102 may generate interaction data based on user session data for each anchor item and candidate recommended item pair. For example, interaction data for each anchor item and candidate recommended item pair may be generated based on customer interactions with item advertisements for the recommended item when the customers view or engage the corresponding anchor item. Interaction data may also be generated based on determining aggregated co-counts such as, for example, co-views, co-purchases, or view-buy counts, for each anchor item and candidate recommended item pair. Co-views may identify a number of times where an anchor item and a recommendation item are viewed together during a session. Co-purchases may identify a number of times where an anchor item and a recommendation item are bought during a same user session. Aggregated view-buy counts may be, for example, a total number of times each anchor item and recommended item has been viewed (e.g., advertisement for the anchor item and recommended item, image of anchor item and recommended item, etc.) and/or purchased. In some examples, the interaction data may be generated based on user session data over a previous amount of time. The interaction data may be stored in database 116.

Advertisement recommendation computing device 102 may also determine popularity data for each item (e.g., anchor and recommended item). Popularity data may include, for example, a number of impressions of each item, a total number of sales for each item, a pricing of each item, ratings or reviews for each item, and numbers of ratings or reviews for each item. Popularity data may be based, for example, on sales made on a website hosted by web server 104, and on sales made at store 109, for example.

Further, advertisement recommendation computing device 102 may determine categorical item data for each item. Categorical data may identify for each item, for example, a primary shelf. The primary shelf of each item may be based on a taxonomical hierarchy that defines which category a product belongs to. For example, a primary shelf for brand "A" laptops may be: Electronics/Computers/Laptops/Brand A Laptops.

Additionally or alternatively, categorical data may identify a product type, a brand, a division, a department (e.g., a retailer department, such as meat, dairy, or produce departments) a category, and a subcategory. Categorical data may also identify other categorical data related to each item.

Advertisement recommendation computing device 102 may generate feature data for each anchor item and candidate recommended item pair based on one or more of interaction data, popularity data, and categorical item data. For example, advertisement recommendation computing device 102 may generate a feature vector for each anchor item and candidate recommended item pair, where each feature vector identifies the anchor item, the recommended item, and corresponding features. In some examples, the features include view-buy counts, contextual, and categorical features, as well as aggregated view-buy count features.

Figure 4:
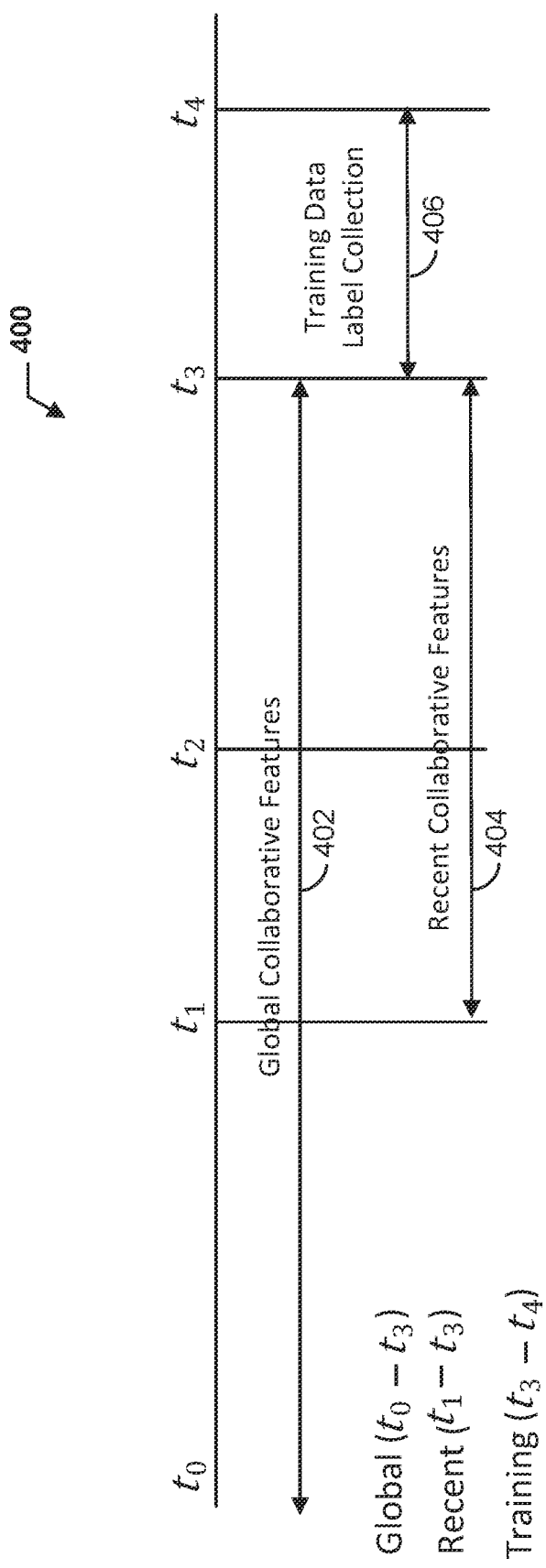
FIG. 4 illustrates a timeline of a training period for training a machine learning process executed by the advertisement recommendation computing device of FIG. 2 in accordance with some embodiments.

In some examples, feature data is generated based on interaction data, popularity data, and categorical item data corresponding to a previous period of time. For example, as illustrated in FIG. 4, timing diagram 400 illustrates that global collaborative features 402 may be generated over a period between time t0 and t3. In some examples, global collaborative features 402 may be generated for a period of three years. Advertisement recommendation computing device 102 may first train the machine learning model with global collaborative features 402.

In some examples, feature data may be generated over a more recent period. For example, as indicated in FIG. 4, recent collaborative features 404 may be generated over a period between time $t_1$ and $t_3$. Recent collaborative features 404 may be generated periodically, such as every eighty days, every three months, every month, every week, etc. Advertisement recommendation computing device 102 may retrain the machine learning algorithm with recent collaborative features 404. For example, advertisement recommendation computing device 102 may periodically generate recent collaborative features 404 periodically, and retrain the machine learning process accordingly with the generated recent collaborative features 404. Global collaborative features 402 and/or recent collaborative features 404 may be generated during training data and label collection period 406.

Advertisement recommendation computing device 102 may train one or more machine learning processes based on the feature data. In some examples, features identifying aggregated view-buy counts are used as labels to train the machine learning process. Each machine learning process may be, for example, a machine learning model (e.g., a machine learning algorithm). In some examples, the machine learning process may be based on decision trees, such as an XGBoost based models. In some examples, the machine learning process may be based on neural networks, or deep learning algorithms, for example.

In some examples, the machine learning process includes a plurality of machine learning models, where each machine learning model is trained with feature data associated with a particular item type (e.g., item division). For example, advertisement recommendation computing device 102 may train a first item-type machine learning model based on feature data for anchor item and recommended item pairs associated with a first item type. Advertisement recommendation computing device 102 may also train a second item-type machine learning model based on feature data for anchor item and recommended item pairs associated with a second item type. Each item type may be, for example, a category of items, a product type of items, a division of items, a primary shelf of items, or any other categorical identification of items.

Once trained, advertisement recommendation computing device 102 may execute the machine learning process to identify recommended item advertisements. For example, advertisement recommendation computing device 102 may execute the machine learning process to determine (e.g., identify) one or more of a plurality of recommended item advertisements to be displayed. For example, given an anchor item and a plurality of recommended item advertisements for that anchor item, advertisement recommendation computing device 102 may execute the machine learning process to identify a ranking of the plurality of recommended item advertisements. In some examples, one or more of higher ranked recommended item advertisements are displayed with the anchor item on a webpage, such as a webpage hosted by web server 104. In some examples, execution of the machine learning process results in generating scores for each recommended item. Recommended items with higher scores are ranked ahead of recommended items with lower scores. In some examples, advertisement recommendation computing device 102 provides a list ranking the recommended advertisements. In some examples, the recommended advertisements are displayed in order according to the list.

In some examples, advertisement recommendation computing device 102 executes the machine learning process to generate data values corresponding to a future time period (e.g., for a specific time slot, day of the week, month, etc.). For example, for each anchor item and candidate recommended item pair, advertisement recommendation computing device 102 may execute the machine learning process to generate view-buy count data identifying a number of times, during the future time period, that an advertisement for the recommended item, if displayed with the anchor item (e.g., displayed on an item page for the anchor item), will be viewed or engaged. In some examples, the view-buy count data identifies a predicted number of times that the recommended item will be bought if displayed with the anchor item. Based on the predicted view-buy count data, advertisement recommendation computing device 102 may rank advertisements for recommended items.

In some examples, advertisement recommendation computing device 102 generates categorical attribute embeddings based on obtained users' session data. The categorical attribute embeddings are based on categories of items identified in the users' session data. Advertisement recommendation computing device 102 may re-rank, or filter, the ranked recommended items based on a similarity with item categories associated with the generated categorical attribute embeddings. For example, advertisement recommendation computing device 102 may allow recommended items associated with categories identified in the generated categorical attribute embeddings, and filter out items not associated with those categories. As such, items that are very different (e.g., as defined by the categorical similarity) are not allowed.

Figure 2:
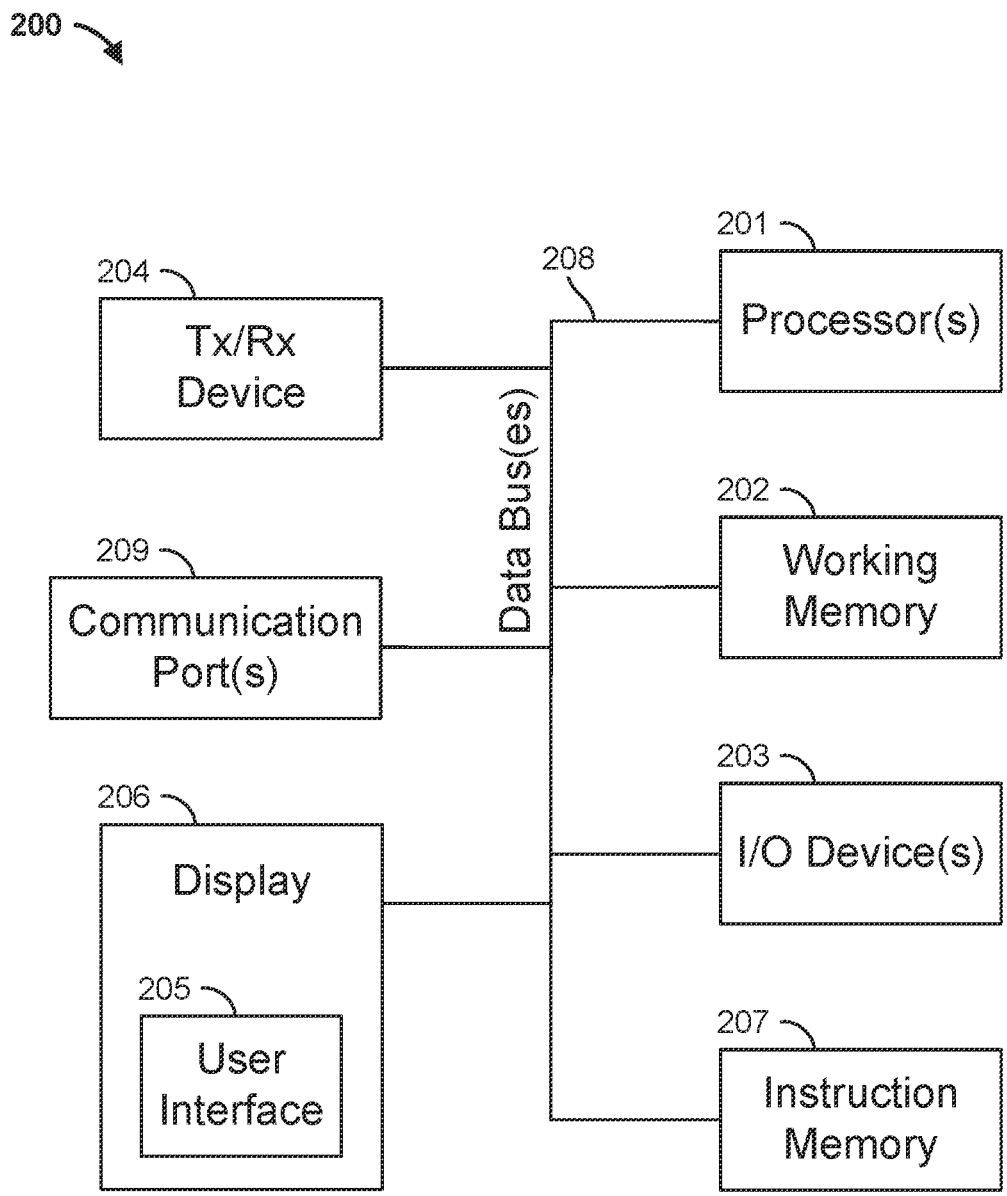
FIG. 2 is a block diagram of the advertisement recommendation computing device of the digital advertisement recommendation system of FIG. 1 in accordance with some embodiments.

FIG. 2 illustrates the advertisement recommendation computing device 102 of FIG. 1, referred to as advertisement recommendation computing device 200 in FIG. 2. Advertisement recommendation computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of advertisement recommendation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with advertisement recommendation computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 advertisement recommendation computing device 102 will be operating in. Processor(s) 201 is operable to receive data from, or send data to, a network, such as communication network 118 of FIG. 1, via transceiver 204.

Figure 3:
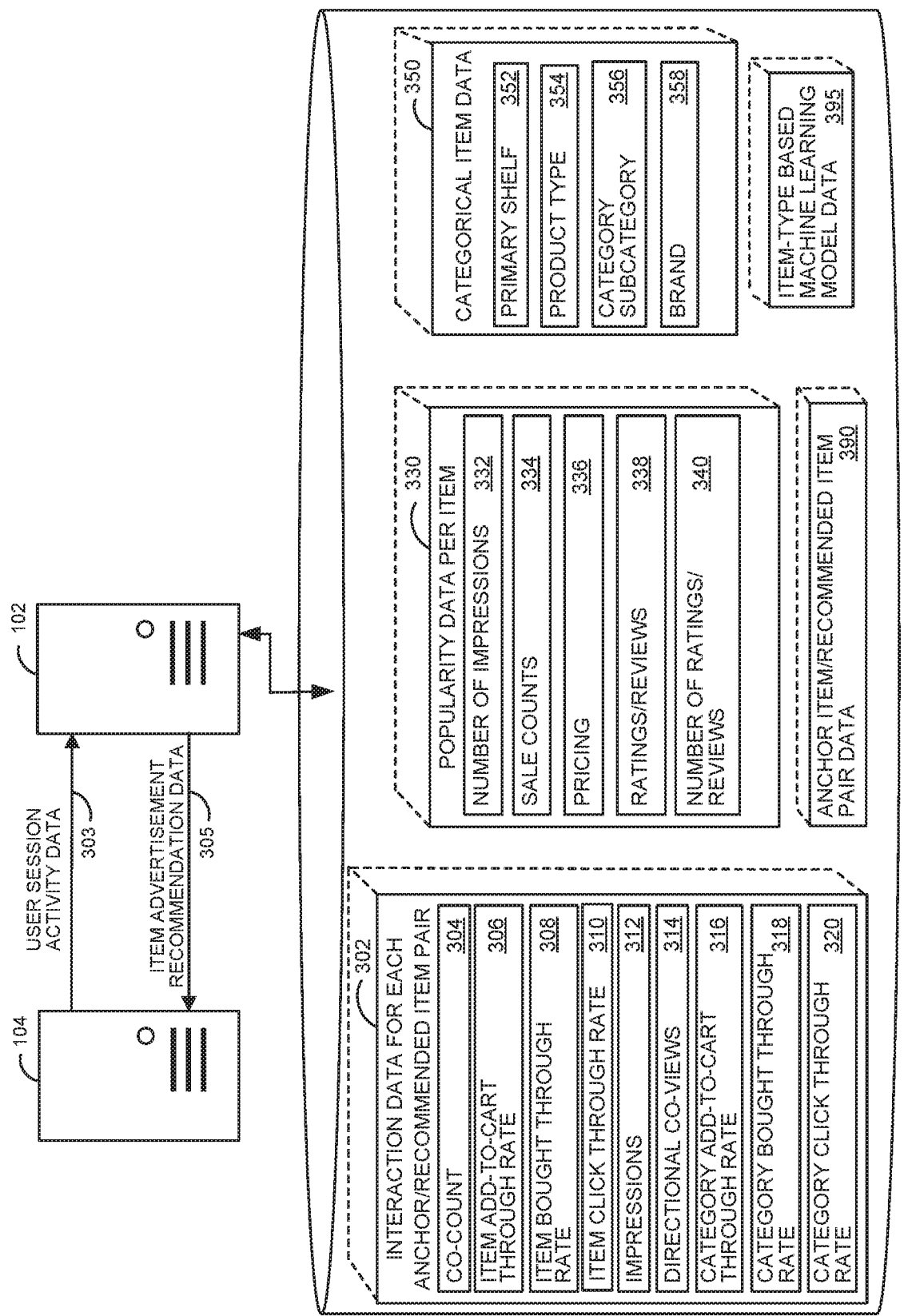
FIG. 3 is a block diagram illustrating examples of various portions of the digital advertisement recommendation system of FIG. 1 in accordance with some embodiments.

FIG. 3 is a block diagram illustrating examples of various portions of the digital advertisement recommendation system 100 of FIG. 1. As indicated in the figure, advertisement recommendation computing device 102 may receive user session activity data 303 from web server 104. User session activity data 303 may identify data associated with browsing sessions of a plurality of users (e.g., customers). For example, user session activity data 303 may identify item advertisements viewed, item advertisements engaged, purchases made through clicking on an item advertisement, item impressions, items added to online shopping carts, co-counts, and any other data related to website browsing sessions. Advertisement recommendation computing device 102 may receive user session activity data 303, and generate and/or update feature data used to train a machine learning process.

For example, based on user session activity data 303, advertisement recommendation computing device 102 may generate at least portions of interaction data 302 for each anchor/recommended item pair. Advertisement recommendation computing device 102 may, for example, parse user session activity data 303 to identify session data related to a particular anchor item, identify at least one recommended item associated with the particular anchor item (e.g., a recommended item that was displayed on an item page of the anchor item), and generate interaction data 302 for that anchor item/recommended item pair 302. Advertisement recommendation computing device 102 may store interaction data 302 in database 116.

Interaction data 302 may include, for each anchor item/recommended item pair, a co-count 304, an item add-to-cart through rate 306, an item bought through rate 308, and an item click-through rate 310. The item add-to-cart through rate 306 may identify a value (e.g., a rate) indicative of how many times a recommended item was added to an online shopping cart. The item bought through rate 308 may identify a value (e.g., a rate) indicative of how many times a recommended item was purchased. The item click-through rate 310 may identify a value (e.g., a rate) indicative of how many times an advertisement for the recommended item was engaged. These rates may be based on when the recommended item was displayed with the anchor item. For example, for a given anchor-recommended item pair, if the recommendation is viewed 10 times and engaged (e.g., clicked) 2 times, then the click through rate is 2/10.

Interaction data 302 may also include impressions 312 for the recommended item, and directional co-views 314. For a given anchor-recommendation pair, directional co-views 314 may identify, for example, a number of times the recommendation is viewed strictly after the anchor item is viewed during a same user session.

Interaction data 302 may further include category add-to-cart through rate 316, category bought through rate 318, and category click-through rate 320. Category add-to-cart through rate 316 may identify a value (e.g., a rate) indicative of how many times items within a category of the recommended item was added to an online shopping cart. Category bought through rate 318 may identify a value (e.g., a rate) indicative of how many times items in a category of the recommended item were purchased. Category click-through rate 320 may identify a value (e.g., a rate) indicative of how many times advertisements for items in a category of the recommended item was engaged.

In some examples, advertisement recommendation computing device 102 may generate and/or update popularity data 330 based on user session activity data 303. Popularity data 330 may include, for example, a number of impressions 332, which identifies a total number of impressions for an item over a period of time. Popularity data 330 may also include sale counts 334 and pricing 336, which may identify a total number of sales for the item, and the prices paid for the item, over the period of time. Popularity data 330 may further include ratings/reviews 338 and number of ratings/reviews 340, which may be obtained from web server 104 based on ratings and/or reviews posted on a website for each item. Advertisement recommendation computing device 102 may store popularity data 330 in database 116. In some examples, popularity data 330 is also based on transaction data received from store 109. The transaction data may identify item sales made at store 109, for example. In some examples, the transaction data includes receipt data for sale transactions.

Advertisement recommendation computing device 102 may, in some examples, generate and/or update categorical item data 350, which may be stored in database 116. Categorical item data 350 may include, for each item, one or more of a primary shelf 352, a product type 354, a category/subcategory 356, and a brand 358, for example.

Based on one or more of interaction data 302, popularity data 330, and categorical item data 350, advertisement recommendation computing device 102 may execute a machine learning process, such as one based on decision trees, to generate item advertisement recommendation data 305 for one or more anchor items. Item advertisement recommendation data 305 identifies one or more recommended items to be displayed for a corresponding anchor item.

Each anchor item and recommended item pair may be identified, for example, by anchor item/recommended item pair data 390 stored in database 116. For example, advertisement recommendation computing device 102 may receive anchor item/recommended item pair data 390 identifying anchor items and recommended item pairs from another computing device, such as a third-party advertisement recommendation system. In some examples, advertisement recommendation computing device 102 generates anchor item/recommended item pair data 390 based on user input (e.g., a user configures anchor item/recommended item pair data 390).

To execute the machine learning process, advertisement recommendation computing device 102 may obtain item-type based machine learning model data 395 from database 116. Item-type based machine learning model data 395 identifies and characterizes a machine learning process, such as one that is based on a plurality of item-type machine learning models (e.g., where each machine learning model was trained based on data related to a particular item type). Advertisement recommendation computing device 102 may execute the machine learning process to generate, for each of a plurality of anchor items, one or more recommended items to advertise. For example, advertisement recommendation computing device 102 may generate a ranking of recommended items for each anchor item.

Figure 5A:
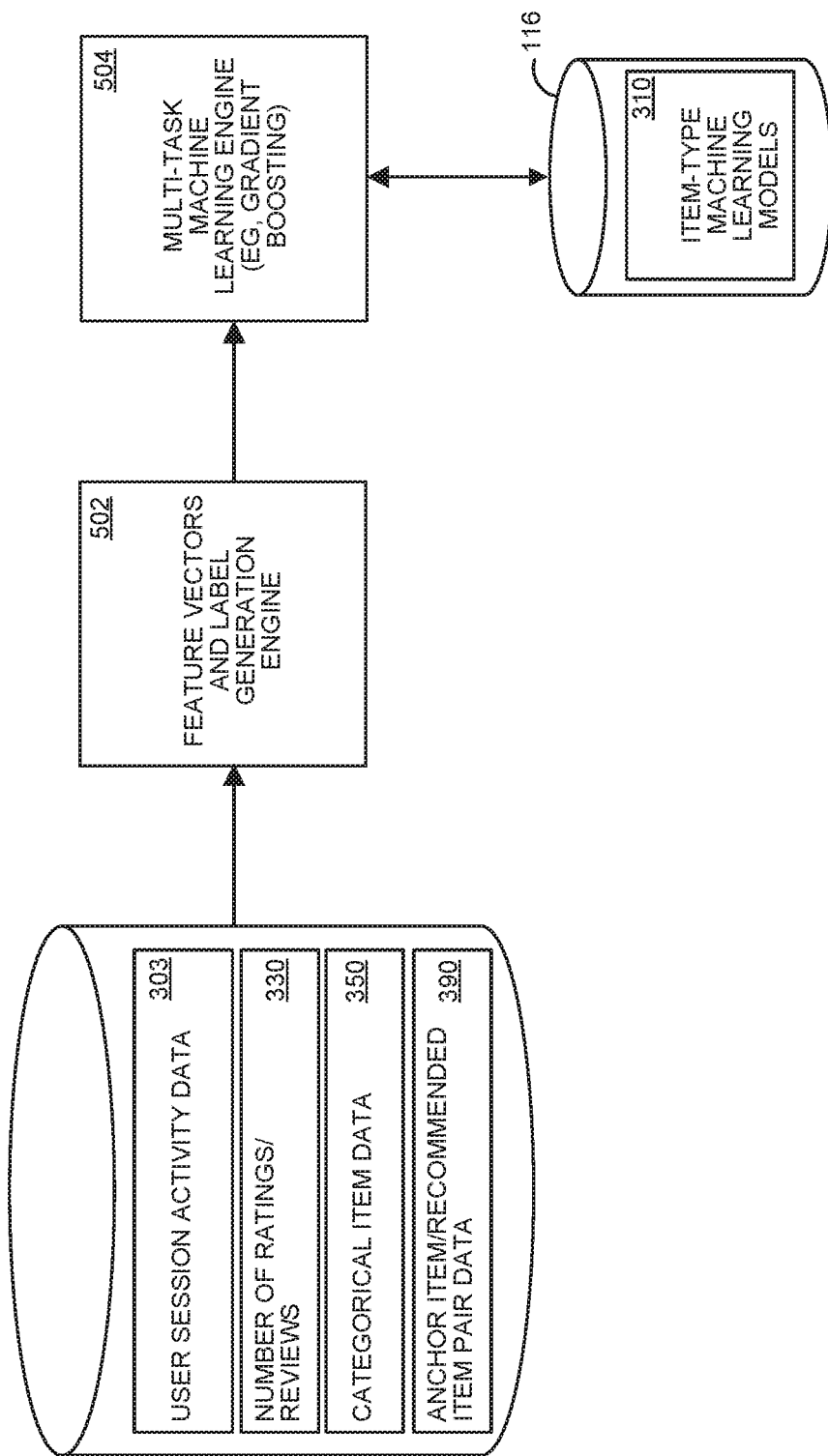
FIGS. 5A, 5B, and 5C illustrate various portions of the digital advertisement recommendation system of FIG. 1 in accordance with some embodiments.
Figure 5B:
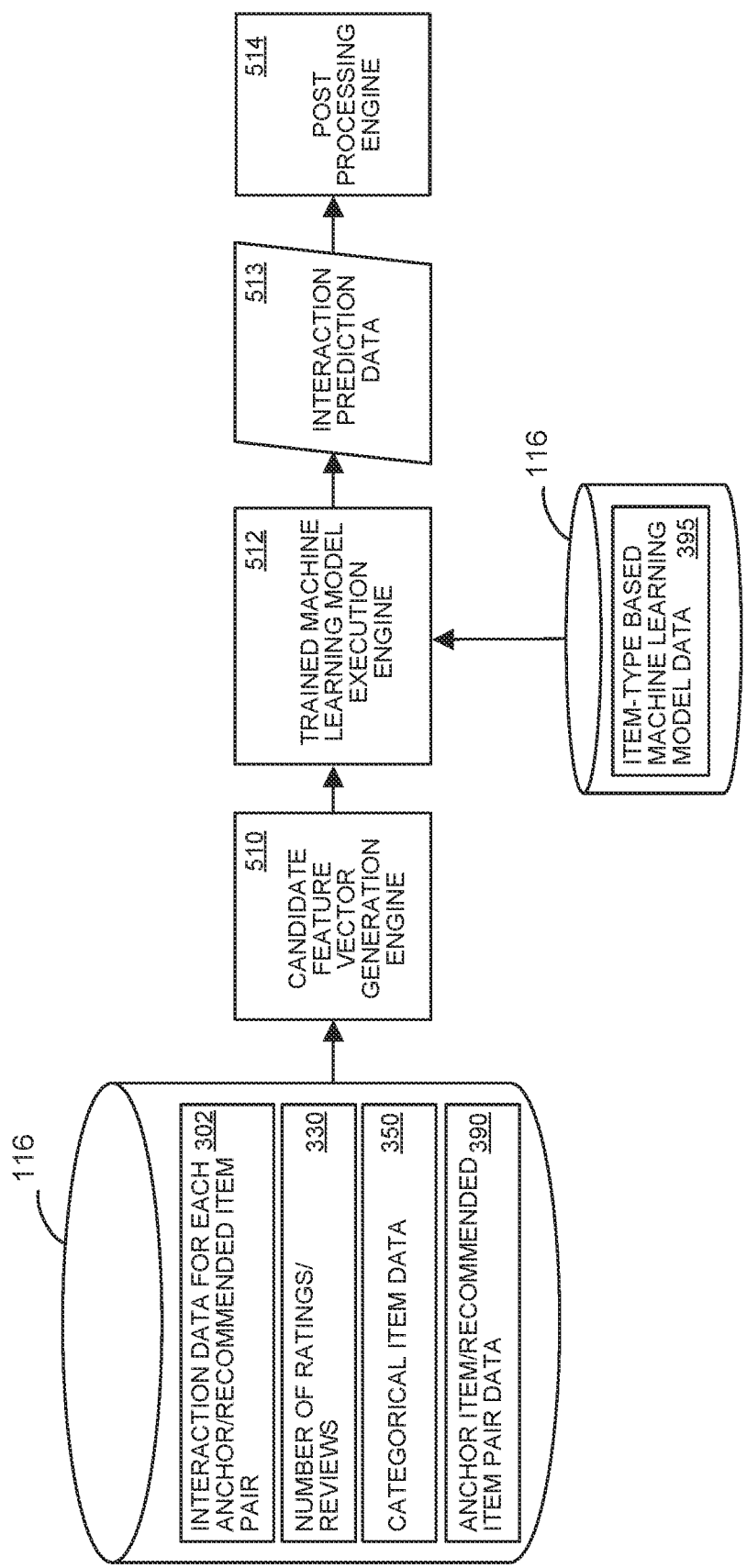
Figure 5C:
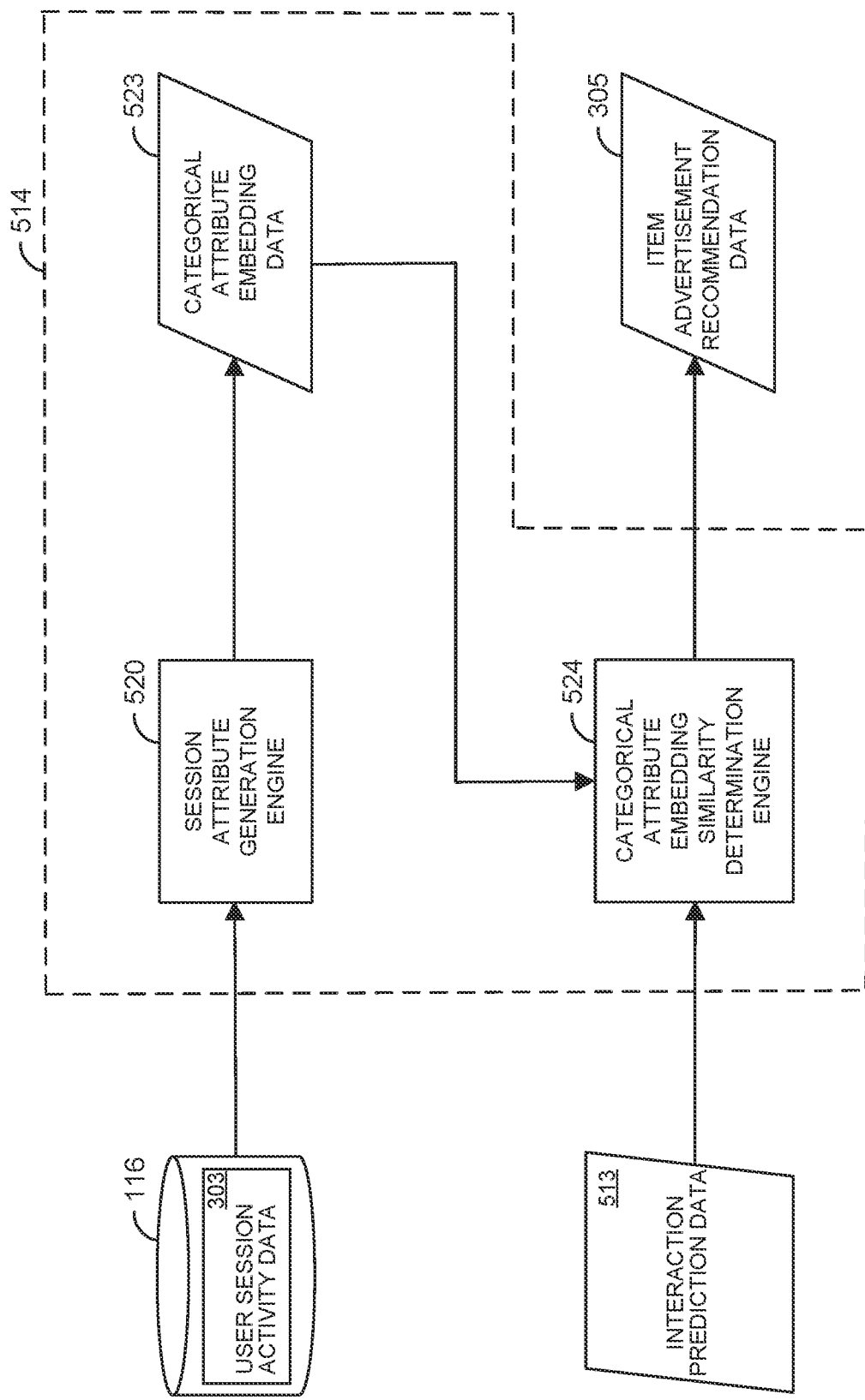

FIGS. 5A, 5B, and 5C illustrates various portions of a digital advertisement recommendation system in accordance with these disclosures, such as the digital advertisement recommendation system 100 of FIG. 1. As illustrated in these figures, advertisement recommendation computing device 102 may include a feature vector and label generation engine 502, a multi-task machine learning engine 504, a candidate feature vector generation engine 510, a trained machine learning model execution engine 512, a post processing engine 514, a session attribute generation engine 520, and a categorical attribute embedding similarity determination engine 524. In some examples, one or more of feature vector and label generation engine 502, multi-task machine learning engine 504, candidate feature vector generation engine 510, trained machine learning model execution engine 512, post processing engine 514, session attribute generation engine 520, and categorical attribute embedding similarity determination engine 524 may be implemented in hardware. In some examples, one or more of feature vector and label generation engine 502, multi-task machine learning engine 504, candidate feature vector generation engine 510, trained machine learning model execution engine 512, post processing engine 514, session attribute generation engine 520, and categorical attribute embedding similarity determination engine 524 may be implemented as an executable program maintained in a tangible, non-transitory memory, such as instruction memory 207 of FIG. 2, which may be executed by one or processors, such as processor 201 of FIG. 2.

Referring to FIG. 5A, feature vector and label generation engine 502 may obtain anchor item/recommended item pair data 390, and corresponding interaction data 302, popularity data 330, and categorical item data 350, from database 116 and, generate feature vectors for each anchor/recommended item pair. For example, each feature vector may identify the anchor item, the recommended item, and corresponding features. In some examples, the features include co-count, contextual, and categorical features, as well as aggregated view-buy count features.

Multi-task machine learning engine 504 receives the feature vectors from feature vector and label generation engine 502, and trains item-type based machine learning models identified by item-type based machine learning model data 395 with the obtained feature vectors. In some examples, item-type based machine learning model data 395 identifies a machine learning model in item-type based machine learning model data 395 for each item type. Multi-task machine learning engine 504 may train each machine learning model based on feature vectors for the corresponding item type.

Referring to FIG. 5B, candidate feature vector generation engine 510 generates candidate feature vectors for an anchor item. Each candidate feature vector may be generated based on a recommended item to advertise on a webpage displaying the anchor item. For example, advertisement recommendation computing device 102 may receive, for each of a plurality of anchor items, a plurality of recommended items to advertise. Candidate feature vector generation engine 510 may generate a feature vector for each recommended item. Candidate feature vector generation engine 510 may generate each feature vector based on corresponding interaction data 302, popularity data 330, and categorical item data 350 obtained from database 116.

Trained machine learning model execution engine 512 obtains the generated feature vectors from candidate feature vector generation engine 510, and executes the trained machine learning process identified by item-type based machine learning model data 395. Based on the execution, trained machine learning model execution engine 512 generates interaction prediction data 513 identifying predicted data values corresponding to a future time period (e.g., for a specific time slot, day of the week, month, etc.). For example, for each anchor item and candidate recommended item pair, trained machine learning model execution engine 512 may execute the trained machine learning model to generate view-buy count data identifying a number of times, during the future time period, that an advertisement for the recommended item, if displayed with the anchor item, will be viewed or engaged. In some examples, the view-buy count data identifies a predicted number of times that the recommended item will be bought if displayed with the anchor item. Based on the predicted view-buy count data, trained machine learning model execution engine 512 may rank advertisements for recommended items.

Post processing engine 514 obtains interaction prediction data 513 from trained machine learning model execution engine 512, and filters out recommended item advertisements based on user sessions data. FIG. 5C shows an example of post processing engine 514. As illustrated in FIG. 5C, session attribute generation engine 520 obtains user session activity data 303 from database 116, and generates categorical attribute embeddings data 523. Categorical attribute embeddings data 523 identify categories of items identified in user session activity data 303. Categorical attribute embeddings data 523 may be generated, for example, based on an embedding model that processes text, such as a category of an item. The embedding model's input may be the name of the category of the item, for example, (e.g., text corpus), and the output may be an embedding vector.

Categorical attribute embedding similarity determination engine 524 may generate item advertisement recommendation data 305 based on a similarity between categories identified by categorical attribute embeddings data 523 and categories of recommended items for items corresponding to interaction prediction data 513. For example, categorical attribute embedding similarity determination engine 524 may generate character embeddings for categories of items corresponding to interaction prediction data 513. Categorical attribute embedding similarity determination engine 524 may compute a distance between each generated recommended item character embedding and categorical attribute embeddings data 523. The distance may be based on a computed similarity (e.g., cosine similarity) between the embedding of an anchor item's category (e.g., as identified by categorical attribute embeddings data 523) and the embedding of recommendation item's category.

If some examples, at least one distance is below a threshold, the recommended item corresponding to interaction prediction data 513 is allowed (e.g., is identified by item advertisement recommendation data 305). Otherwise, if no distance (for a given recommended item) is below the threshold, the recommended item corresponding to interaction prediction data 513 is not allowed (e.g., is not identified by item advertisement recommendation data 305).

In some examples, a mean similarity of different categorical attributes (e.g., primary shelf, reporting hierarchy, product type) of the anchor item and the recommended item is computed. If the mean is above a threshold, the recommendation is allowed. Otherwise, if the mean similarity is below the threshold, the recommendation item is not allowed.

Figure 6:
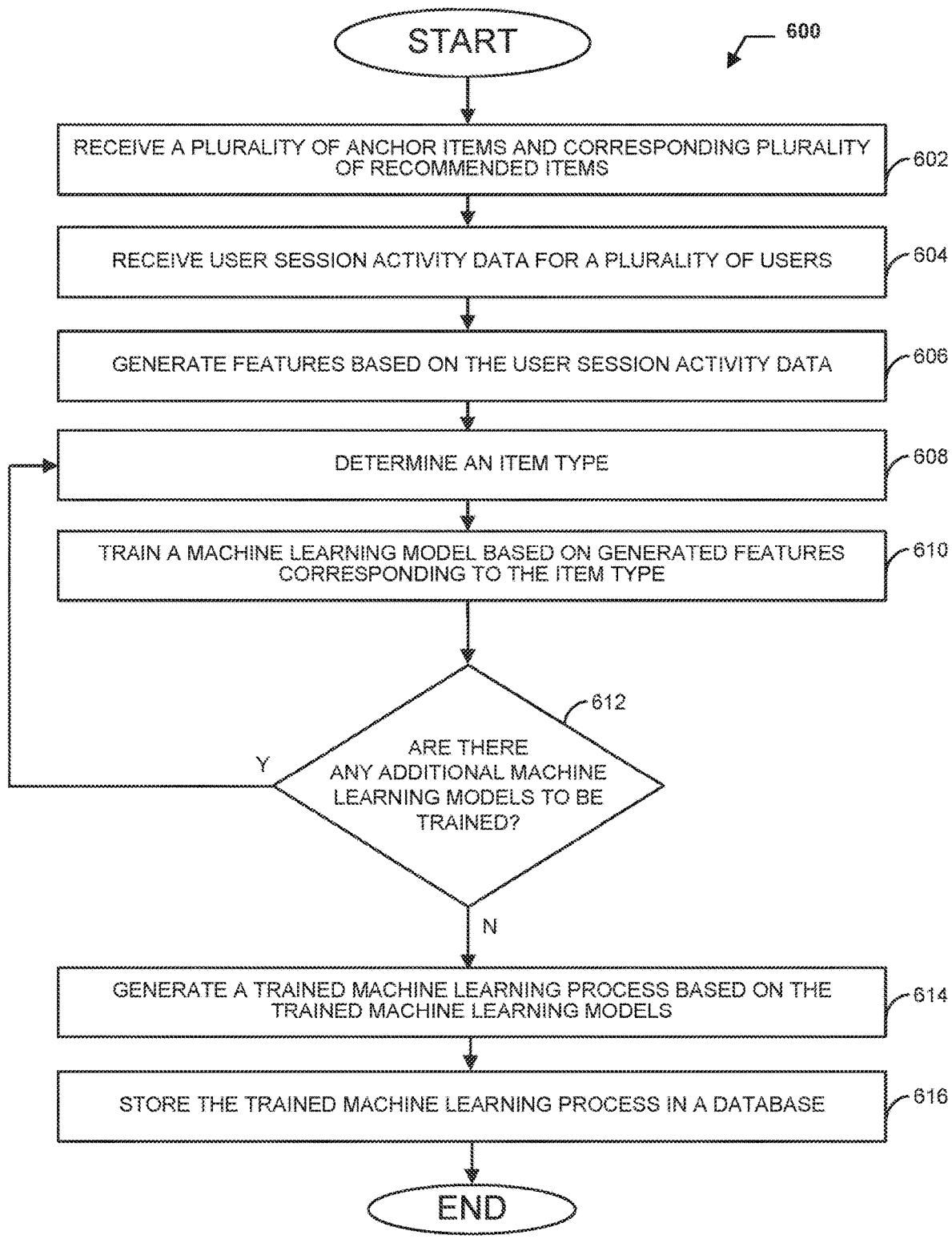
FIG. 6 is a flowchart of an example method that can be carried out by the advertisement recommendation computing device of FIG. 2 in accordance with some embodiments.

FIG. 6 is a flowchart of an example 600 that can be carried out by the digital advertisement recommendation system 100 of FIG. 1. Beginning at step 602, a plurality of anchor items and a corresponding plurality of recommended items for each anchor item is received. At step 604, user session activity data 303 is received for a plurality of users. At step 606, features are generated based on the user session activity data 303. For example, interaction data 302, popularity data 330, and categorical item data 350 may be generated based on the user session activity data 303. Features may then be generated based on the interaction data 302, popularity data 330, and categorical item data 350. For example, feature vectors and label generation engine 502 may generate the features.

Proceeding to step 608, an item type is determined. The item type may be an item type of an item associated with the user session activity data 330, for example. At step 610, a machine learning model corresponding to the item type is trained based on generated features corresponding to the item type. For example, the item type may be an item category. The machine learning model may be trained with features generated from data (e.g., interaction data 302, popularity data 330, and categorical item data 350) including items in the item category. At step 612, a determination is made as to whether there are any additional machine learning models to train. If another machine learning model is to be trained, the method proceeds back to step 608, where another item type is determined. Otherwise, if there are no additional machine learning models to train, the method proceeds to step 614.

At step 614, a trained machine learning process is generated based on the trained machine learning models. The trained machine learning process may include the trained machine learning models. For example, upon receive data related to a recommended item, the trained machine learning process may execute a corresponding machine learning model based on an item type of the recommended item. Proceeding to step 616, the trained machine learning process is stored in a database. For example, the trained machine learning process may be stored in database 116 as item-type based machine learning model data 395. The method then ends.

Figure 7:
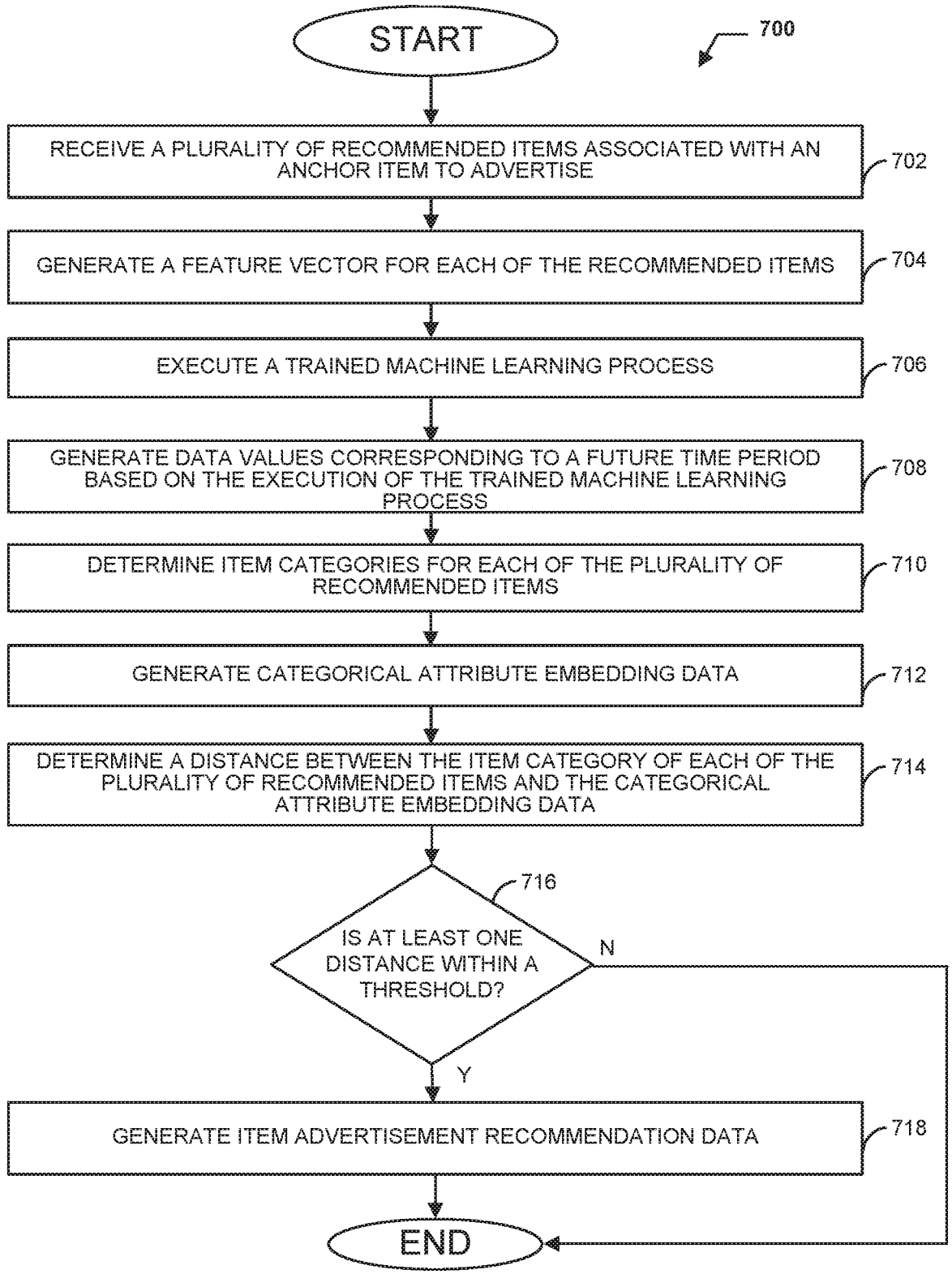
FIG. 7 is a flowchart of another example method that can be carried out by the advertisement recommendation computing device of FIG. 2 in accordance with some embodiments.

FIG. 7 is a flowchart of an example method 700 that can be carried out by the digital advertisement recommendation system 400 of FIG. 4. At step 702, a plurality of recommended items associated with an anchor item to advertise are received. At step 704, a feature vector is generated for each of the plurality of recommended items. Each feature vector may identify, for example, the anchor item, the recommended item, co-count features, contextual features, categorical features, as well as aggregated view-buy count features.

Proceeding to step 706, a trained machine learning process is executed. For example, item-type based machine learning model data 395 may be obtained from database 116, and the trained machine learning process identified and characterized may be executed. The machine learning process may be based on decision trees, for example. At step 708, based on execution of the machine learning process, data values corresponding to a future time period are generated. For example, the data may be view-buy count data, where the view-buy count data identifies a predicted number of times a recommended item will be purchased during the future time period.

Proceeding to step 710, item categories for each the plurality of recommended items are determined. For example, the category for each item may be determined based on obtaining data from a database identifying item properties, such as item categories. At step 712, categorical attribute embedding data 523 is generated. Categorical attribute embedding data 523 identifies category item embeddings and may be generated, for example, based on user session activity data 303. At step 714, a distance between the item category of each of the plurality of recommended items and the categorical attribute embedding data 523 is determined.

At step 716, a determination is made as to whether at least one determined distance is within a threshold. If at least one computed distance is within the threshold, the method proceeds to step 718. At step 718, item advertisement recommendation data 305 is generated indicating that the recommended item is to be advertised. The method then ends. Otherwise, if at step 716 the at least one computed distance is not within the threshold, the method ends.

Figure 8:
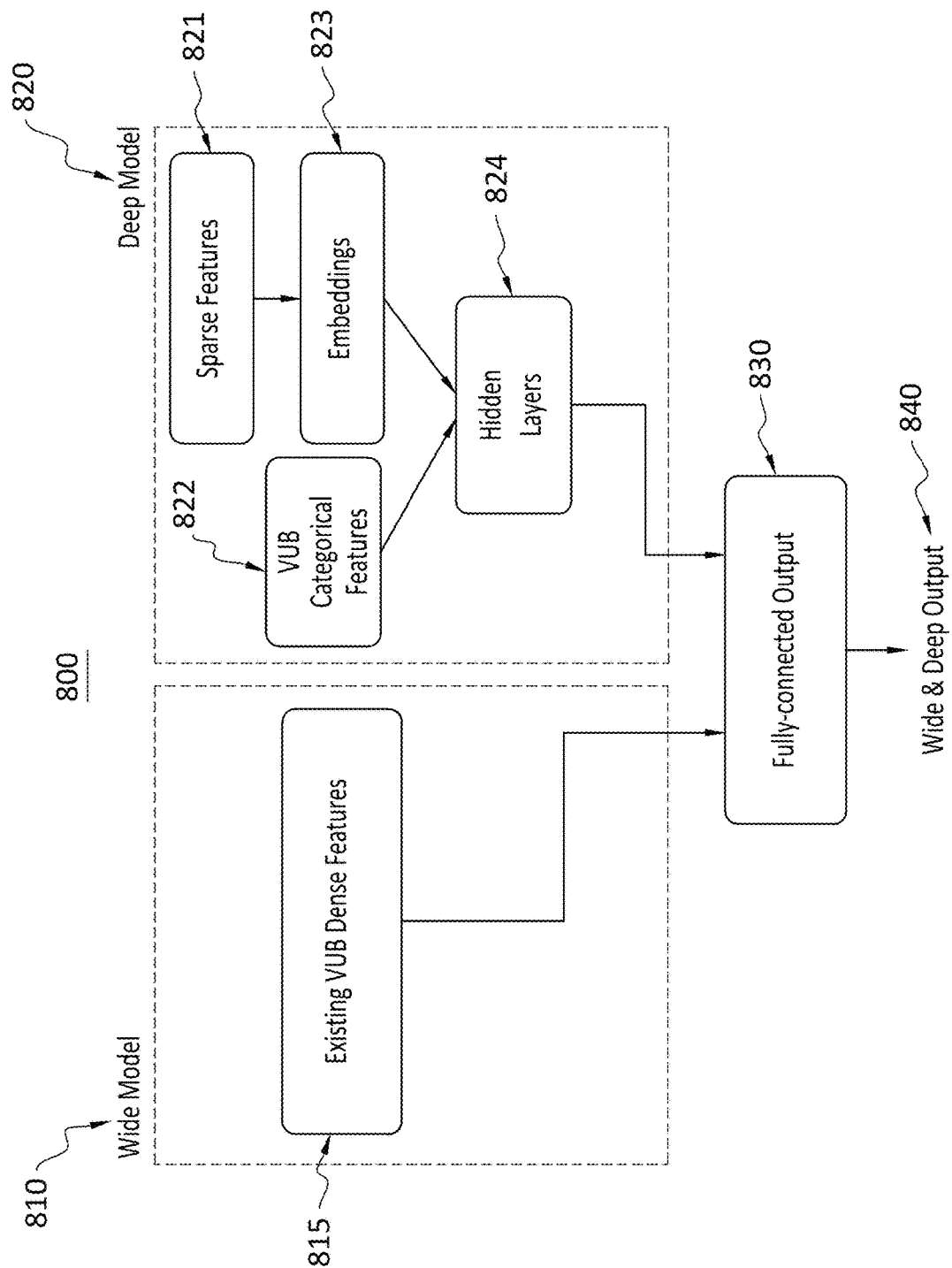
FIG. 8 illustrates a flow chart for method, according to an embodiment.

Turning ahead in the drawings, FIG. 8 illustrates a flow chart of a method 800, according to another embodiment. In some embodiments, method 800 can include generating similar item recommendations for an item based on a combination of machine learning models using dense and sparse features. Method 800 can be employed in many different embodiments and/or examples not specifically depicted or described herein. In some embodiments, the procedures, the processes, and/or the activities of method 800 can be performed in the order presented or in parallel. In other embodiments, the procedures, the processes, and/or the activities of method 800 can be performed in any suitable order. In still other embodiments, one or more of the procedures, the processes, and/or the activities of method 800 can be combined or skipped. In several embodiments, digital advertisement recommendation system 100 (FIG. 1) can be suitable to perform method 800 and/or one or more of the activities of method 800.

In these or other embodiments, one or more of the activities of method 800 can be implemented as one or more computing instructions configured to run at one or more processors and configured to be stored at one or more non-transitory computer-readable media. Such non-transitory computer-readable media can be part of a computer system such as method 800 and/or digital advertisement recommendation system 100 (FIG. 1). The processor(s) can be similar or identical to the processor(s) described above with respect to advertisement recommendation computing device 200 (FIG. 2).

In many embodiments, method 800 can be performed by a wide model 810, a deep model 820, a fully-connected output 830, and a wide and deep output 840. In several embodiments, wide model 810 and deep model 820 are both machine learning models that can be used to determine similar item recommendations for an anchor item using separate sources of data, such as dense features 815, sparse features 821, and/or categorical features 822. In many embodiments, the systems of method 800 can be modules of computing instructions (e.g., software modules) stored at non-transitory computer readable media that operate on one or more processors. In other embodiments, the systems of column method 800 can be implemented in hardware.

As an example, dense features 815, can include a number of impressions of each item, a total number of sales for each item, pricing of each item, numbers of ratings or reviews for each item, the price difference between the item and recommendation pair, number of customer reviews for an item, and/or another suitable type of dense feature.

Figure 10:
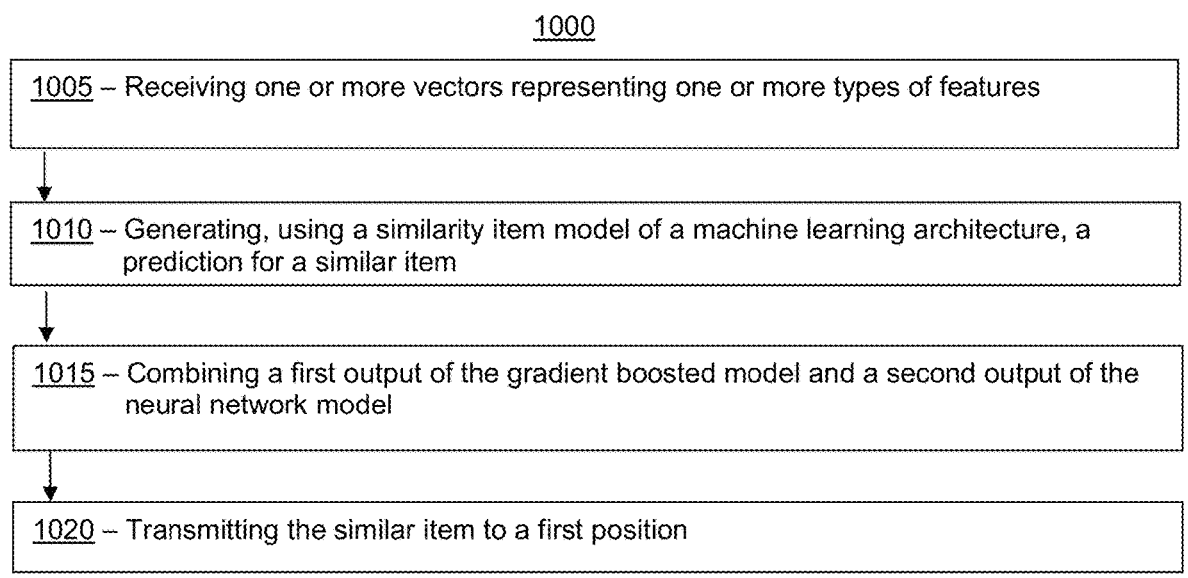
FIG. 10 is a flow chart for a method, according to an embodiment.

In some embodiments, wide model 810 can be performed by a machine learning model using dense features 815 as input data and for training data. Such a machine learning model can include a gradient boosted model and/or another suitable supervised machine learning technique for regression and/or classification that aggregates an ensemble of weak models for a stronger (e.g., accurate) model. In many embodiments, deep model 820 can be similar or identical to multi-task machine learning engine 504 (FIG. 5). Dense features 815 can be similar or identical to interaction data 302 (FIG. 3) and user session activity data 303 (FIG. 3). In several embodiments, method 800 can proceed after wide model 810 to fully-connected output 830. In some embodiments, wide model 810 can be implemented as described above in multi-task machine learning engine 504 (FIG. 5), trained machine learning model execution engine 512 (FIG. 5), and/or in block 1010 (FIG. 10).

In various embodiments, deep model 820 can be performed by a machine learning model, such as a neural network, having input layers of sparse features 821, categorical features 822, embeddings 823, and hidden layers 824 between the input and the output layers. In several embodiments, embeddings 823 can include title and brand, descriptions, images and/or other suitable inputs. In some embodiments, categorical features 822 can include anchor item and recommendation pairs. For example, an anchor item and a recommendation item both can be recommended as similar items when both share one or more of the same departments, item category, sub-category, shelf, division, brand, popularity, and/or star ratings, and/or another suitable input. Categorical features 822 can be similar or identical to categorical attribute embeddings data 523 (FIG. 5). In various embodiments, method 800 can proceed after deep model 820 to fully-connected output 830. In some embodiments, deep model 820 can be implemented as described below in connection with block 1010 (FIG. 10).

In a number of embodiments, method 800 can include a fully-connected output 830. In some embodiments, fully-connected output 830 can be a neural network layer that can be connected to the output of the deep model 820 and the output of the wide model 810. In several embodiments, the neural network in fully-connected output 830 can be trainable, meaning it can adjust the weights of the neural network using the training examples from the data. Accordingly, the fully-connected output 830 learns the proper weights to assign to the deep part and the wide part of the network (i.e., deep model 820 and wide model 810, respectively). In various embodiments, method 800 can proceed after fully-connected output 830 to wide and deep output 840. In some embodiments, fully-connected output 830 can be implemented as described below in connection with block 1010 (FIG. 10).

In some embodiments, method 800 can include wide and deep output 840 of generating a similarity score for a pair of items. In several embodiments, the wide and deep output 840 is a neural network with a softmax activation layer. In various embodiments, the softmax activation layer can ensure that the final output of the wide and deep output 840 is always a number between zero and one. In a number of embodiments, the output of wide and deep output 840 can be referred to as a similarity score because for a given items pair where the higher the similarity score, the more likely that these two items are more similar to each other. In some embodiments, this similar score can be calculated for all item pairs in the model. In several embodiments, the process of calculating the output of wide and deep output 840 for all items pairs can be referred to as model inferencing. In some embodiments, wide and deep output 840 can be implemented as described below in connection with block 1020 (FIG. 10).

Figure 9:
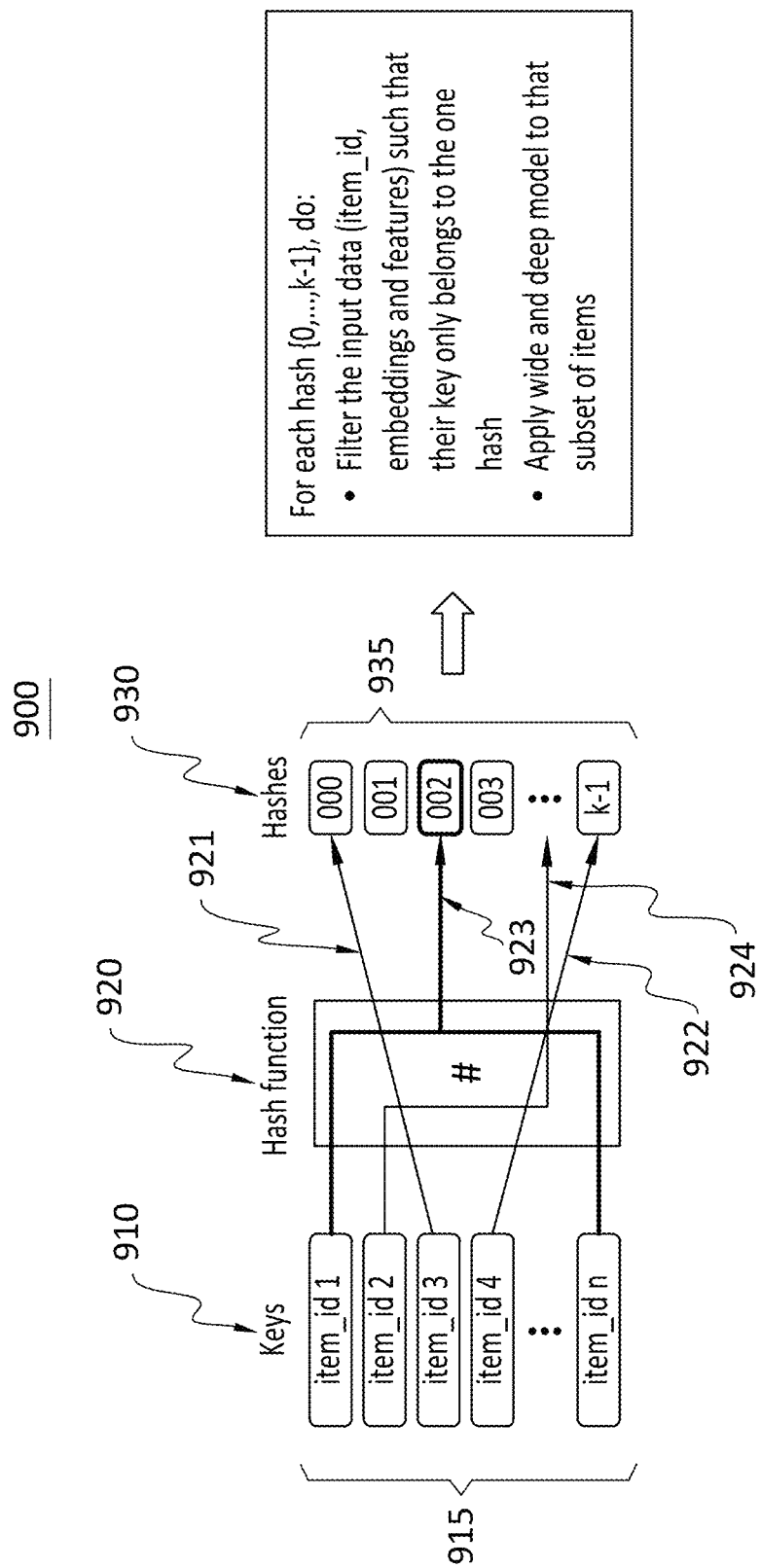
FIG. 9 illustrates a diagram of an exemplary hashing approach, according to an embodiment.

Referring to the drawings, FIG. 9 illustrates an exemplary hashing function used to train a machine learning model using large amounts of data to implement training and inferencing in batches. In some embodiments, due to internal memory limitations, running the inferencing for a large number of items can be infeasible in one computer machine. Therefore, in several embodiments, a load distribution method can be devised to distribute the load of inferencing across multiple computing machines which can be run in parallel. In other embodiments, the load distribution can be achieved through employment of hash function 920 over item_ids 910. In these other embodiments, all items can be distributed among k different buckets 930, and inferencing can be performed on all items in one bucket at a time to ensure the load can fit in to the memory of one computer machine.

In some embodiments, item_id 910 can be a unique numerical representation of an item in a data catalog. In several embodiments, the hash function 920 can take the item_id and assign it to one of the k buckets 930. In various embodiments, the hash function 920 can ensure a uniform distribution of items between the k buckets 930. In some embodiments, employing this hashing method can ensure each item can only be placed at one bucket, and the inferencing can be effectively distributed and performed in parallel on one computer machine. Method 900 is merely exemplary and is not limited to the embodiments presented herein. Method 900 can be employed in many different embodiments and/or examples not specifically depicted or described herein.

In some embodiments, method 900 can include filtering input data, item_ids 915 such that each item_id 915 belongs to one hash of multiple hashes 935 implemented by hash function 920. In several embodiment, the significance of hashing can be the ability of the hash function to distribute items somewhat equally among k buckets. An example of hashing is provided below, once the hashing is complete, it can be anticipated that each bucket (hash) has nearly the same number of items assigned to it, for example:
  (i) item_id 3 can be mapped to hash 000.
  (ii) item_id 4 can be mapped to hash k-1.
  (iii) item_id 1 and item_id n can be hashed to hash 002.
  (iv) item_id 2 can be mapped to another hash.

Turning ahead in the drawings, FIG. 10 illustrates a flow chart for a method 1000, according to another embodiment. In some embodiments, method 1000 can be a method of automatically generating similar item recommendations based on a wide and deep framework. Method 1000 further can be a method of loading a similar item recommendation in a first position on a website carousel concurrently displayed while a user is viewing the anchor item on the website. Method 1000 is merely exemplary and is not limited to the embodiments presented herein. Method 1000 can be employed in many different embodiments and/or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In several embodiments, digital advertisement recommendation system 100 (FIG. 1) can be suitable to perform method 1000 and/or one or more of the activities of method 1000.

In these or other embodiments, one or more of the activities of method 1000 can be implemented as one or more computing instructions configured to run at one or more processors and configured to be stored at one or more non-transitory computer-readable media. Such non-transitory computer-readable media can be part of a computer system such as digital advertisement recommendation system 100 (FIG. 1). The processor(s) can be similar or identical to the processor(s) described above with respect to advertisement recommendation computing device 200 (FIG. 2).

Referring to FIG. 10, method 1000 can include a block 1005 of receiving one or more vectors representing one or more types of features for a pair of items. In some embodiments, the pair of items can include an anchor item and a similar item. In various embodiments, the one or more types of features comprise (i) dense features comprising session activities and (ii) sparse features comprising data listed in a catalog. In several embodiments, transforming features into vectors can be similar or identical to feature vector and label generation engine 502 (FIG. 5A), and/or candidate feature vector generation engine 510 (FIG. 5B). In various embodiments, block 1005 can be implemented as described above in connection with step 704 (FIG. 7).

In several embodiments, method 1000 can include a block 1010 of generating, using a similarity item model of a machine learning architecture, a prediction for a similar item. In many embodiments, the similarity item model can combine a pair of separately trained machine learning models. In some embodiments, the pair of separately trained machine learning models can comprise a gradient boosted model and a neural network model.

In some embodiments, block 1010 can include using the gradient boosted model to determine the first output comprising a dense feature value. In various embodiments, input data used to train the gradient boosted model comprises historical data comprising sparse features derived from item descriptions over a period of time such as one week, one month, six months, or longer. In several embodiments, block 1010 can be similar or identical to machine learning model data 395 (FIG. 3.)

In many embodiments, block 1010 can include using the neural network model to determine the second output comprising a sparse feature value. In several embodiments, input data used to train the neural network model comprises historical data comprising dense features derived from user interaction data associated with a respective item over a period of time such as one week, one month, six months, or longer.

In various embodiments, method 1000 can include a block 1015 of combining a first output of the gradient boosted model and a second output of the neural network model to generate a similarity score for the pair of items.

In some embodiments, based on a ranking of the similarity score, method 1000 can include a block 1020 of combining a first output of the gradient boosted model and a second output of the neural network model to generate a similarity score for the pair of items.

Figure 11:
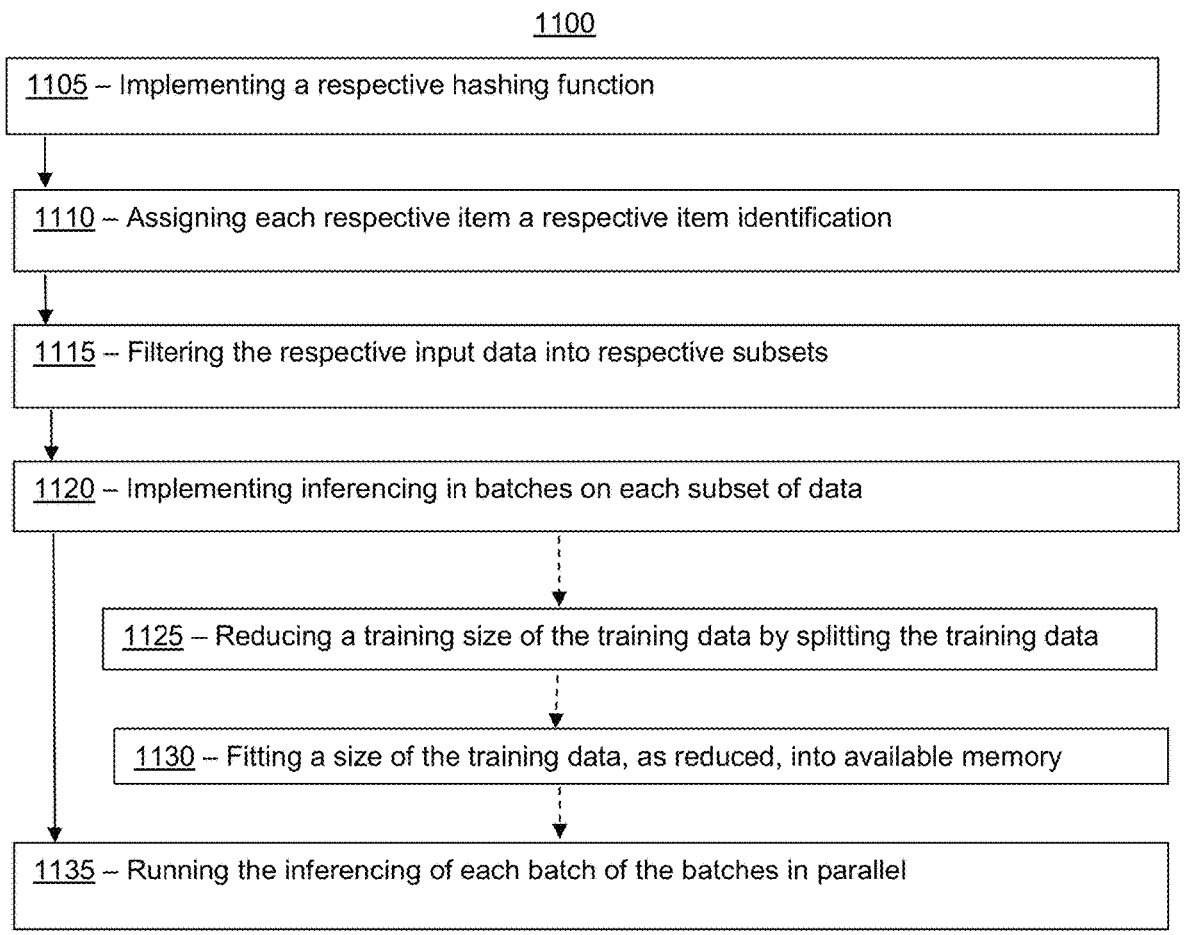
FIG. 11 is a flow chart for a method, according to an embodiment.

Turning ahead in the drawings, FIG. 11 illustrates a flow chart for a method 1100, according to another embodiment. In some embodiments, method 1100 can be a method of automatically allowing each machine learning model to train in batches that encapsulate anchor items and recommendation pairs using a hashing function. Method 1100 is merely exemplary and is not limited to the embodiments presented herein. Method 1100 can be employed in many different embodiments and/or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped. In several embodiments, digital advertisement recommendation system 100 (FIG. 1) can be suitable to perform method 1100 and/or one or more of the activities of method 1100.

In these or other embodiments, one or more of the activities of method 1100 can be implemented as one or more computing instructions configured to run at one or more processors and configured to be stored at one or more non-transitory computer-readable media. Such non-transitory computer-readable media can be part of a computer system such as \digital advertisement recommendation system 100 (FIG. 1). The processor(s) can be similar or identical to the processor(s) described above with respect to advertisement recommendation computing device 200 (FIG. 2).

Referring to FIG. 11, method 1100 can include a block 1105 of implementing a respective hashing function for each respective type of training data used for a respective machine learning model.

In various embodiments, method 1100 can include a block 1110 of assigning each respective item a respective item identification (item_id) as respective input data for each respective type of the training data of the respective machine learning model.

In some embodiments, method 1100 can include filtering the respective input data into respective subsets. In several embodiments, the respective subsets comprise respective anchor items and respective item pairs that are similar to the respective anchor items. In various embodiments, each item_id of the respective item identification corresponds to one respective hash.

In several embodiments, method 1100 can include a block 1120 of implementing inferencing in batches on each subset of data.

In some embodiments, method 1100 can optionally include a block 1125 of reducing a training size of the training data by splitting the training data based on the respective item_id of the respective item identification associated with each batch.

In a number of embodiments, method 1100 can optionally include a block 1130 of fitting a size of the training data, as reduced, into available memory on an electronic device.

In some embodiments, method 1100 can include a block 1135 of running the inferencing of each batch of the batches in parallel with each other.

Returning back to FIG. 8, in various embodiments, wide model 810 can at least partially perform block 1005 (FIG. 10) of of receiving one or more vectors representing one or more types of features for a pair of items; block 1105 (FIG. 11) of implementing a respective hashing function for each respective type of training data used for a respective machine learning model; block 1120 (FIG. 11) of implementing inferencing in batches on each subset of data; block 1125 (FIG. 11) of reducing a training size of the training data by splitting the training data based on the respective item_id of the respective item identification associated with each batch, and/or block 1130 (FIG. 11) of fitting a size of the training data, as reduced, into available memory on an electronic device.

In some embodiments, deep model 820 can at least partially perform block 1005 (FIG. 10) of of receiving one or more vectors representing one or more types of features for a pair of items; block 1105 (FIG. 11) of implementing a respective hashing function for each respective type of training data used for a respective machine learning model; block 1120 (FIG. 11) of implementing inferencing in batches on each subset of data; block 1125 (FIG. 11) of reducing a training size of the training data by splitting the training data based on the respective item_id of the respective item identification associated with each batch; and/or block 1130 (FIG. 11) of fitting a size of the training data, as reduced, into available memory on an electronic device.

In several embodiments, fully connected output 830 can at least partially perform block 1015 (FIG. 10) of combining a first output of the gradient boosted model and a second output of the neural network model to generate a similarity score for the pair of items, block 1020 (FIG. 10) of combining a first output of the gradient boosted model and a second output of the neural network model to generate a similarity score for the pair of items.

In various embodiments, wide and deep output 840 can at least partially perform block 1020 (FIG. 10) of generating, using a similarity item model of a machine learning architecture, a prediction for a similar item.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatically generating a similar item recommendation for an anchor item using a combination of machine learning models has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIGS. 3-11 may include different procedures, processes, and/or activities and be performed by many different modules, in many different orders, and/or one or more of the procedures, processes, or activities of FIGS. 3-11 may include one or more of the procedures, processes, or activities of another different one of FIGS. 3-11. Additional details regarding ecosystem 305, rules engine 360, content source 370, content feed 380, webserver 390 and/or content catalog 395, (see FIGS. 3 and 6) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a processor; and
   a non-transitory computer-readable medium storing computing instructions that, when executed on the processor one or more processors, cause the processor to perform functions comprising:
   receiving one or more vectors representing one or more types of features for a pair of items, wherein the pair of items comprises an anchor item and a similar item;
   generating, using a similarity item model of a machine learning architecture, a prediction for a similar item, wherein the similarity item model combines outputs from a pair of separately trained machine learning models, wherein the pair of separately trained machine learning models comprise a gradient boosted model, wherein the gradient boosted model is trained using historical data comprising sparse features derived from item descriptions comprising data listed in a catalog over a period of time, wherein the pair of separately trained machine learning models further comprise a neural network model, and wherein the neural network model is trained using historical data comprising dense features comprising session activity data derived from user interaction data associated with respective items over the period of time;
   combining a first output of the gradient boosted model and a second output of the neural network model to generate a similarity score for the pair of items;
   generating categorical attribute embeddings based on the session activity data;
   filtering the similarity score based on the categorical attribute embeddings, wherein the filtering comprises determining a distance value between a category of the similar item and a categorical attribute embedding of the similar item; and
   based on a ranking of the similarity score, transmitting the similar item to a first position on a carousel display of a website that concurrently displays the anchor item on the website.

2. The system of claim 1, wherein generating the prediction for the similar item comprises:
   using the gradient boosted model to determine the first output comprising a dense feature value; and
   using the neural network model to determine the second output comprising a sparse feature value.

3. The system of claim 1, wherein the computing instructions, when executed on the processor, further cause the processor to perform additional functions comprising:
   implementing a respective hashing function for each respective type of training data used for a respective machine learning model; and
   assigning each respective item a respective item identification (item_id) as respective input data for each respective type of the training data of the respective machine learning model.

4. The system of claim 3, wherein the computing instructions, when executed on the processor, further cause the processor to perform additional functions comprising:
   filtering the respective input data into respective subsets, wherein the respective subsets comprise respective anchor items and respective item pairs that are similar to the respective anchor items, and wherein each item_id of the respective item identification corresponds to one respective hash.

5. The system of claim 3, wherein the computing instructions, when executed on the processor, further cause the processor to perform additional functions comprising:
   implementing inferencing in batches on each subset of data; and
   running the inferencing of each batch of the batches in parallel.

6. The system of claim 3, wherein the computing instructions, when executed on the processor, further cause the processor to perform additional functions comprising:

reducing a training size of the training data by splitting the training data based on a respective item_id of the respective item identification associated with each batch.

7. The system of claim 3 wherein the computing instructions, when executed on processor, further cause the processor to perform additional functions comprising:
fitting a size of the training data, as reduced, into available memory on an electronic device.

8. A method being implemented via execution of computing instructions configured to run on a processor and stored at a non-transitory computer-readable medium, the method comprising:
receiving one or more vectors representing one or more types of features for a pair of items, wherein the pair of items comprises an anchor item and a similar item;
generating, using a similarity item model of a machine learning architecture, a prediction for a similar item, wherein the similarity item model combines outputs from a pair of separately trained machine learning models, wherein the pair of separately trained machine learning models comprise a gradient boosted model, wherein the gradient boosted model is trained using historical data comprising sparse features derived from item descriptions comprising data listed in a catalog over a period of time, wherein the pair of separately trained machine learning models further comprise a neural network model, and wherein the neural network model is trained using historical data comprising dense features comprising session activity data derived from user interaction data associated with respective items over the period of time;
combining a first output of the gradient boosted model and a second output of the neural network model to generate a similarity score for the pair of items;
generating categorical attribute embeddings based on the session activity data;
filtering the similarity score based on the categorical attribute embeddings, wherein the filtering comprises determining a distance value between a category of the similar item and a categorical attribute embedding of the similar item; and
based on a ranking of the similarity score, transmitting the similar item to a first position on a carousel display of a website that concurrently displays the anchor item on the website.

9. The method of claim 8, wherein generating the prediction for the similar item comprises:
using the gradient boosted model to determine the first output comprising a dense feature value; and
using the neural network model to determine the second output comprising a sparse feature value.

10. The method of claim 8, further comprising:
implementing a respective hashing function for each respective type of training data used for a respective machine learning model; and
assigning each respective item a respective item identification (item_id) as respective input data for each respective type of the training data of the respective machine learning model.

11. The method of claim 10, further comprising:
filtering the respective input data into respective subsets, wherein the respective subsets comprise respective anchor items and respective item pairs that are similar to the respective anchor items, and wherein each item_id of the respective item identification corresponds to one respective hash.

12. The method of claim 10, further comprising:
implementing inferencing in batches on each subset of data; and
running the inferencing of each batch of the batches in parallel.

13. The method of claim 10, further comprising:
reducing a training size of the training data by splitting the training data based on a respective item_id of the respective item identification associated with each batch.

14. The method of claim 10, further comprising:
fitting a size of the training data, as reduced, into available memory on an electronic device.

15. A non-transitory computer-readable medium storing instructions, wherein the instructions, upon execution by a processor, cause the processor to perform operations comprising:
receiving one or more vectors representing one or more types of features for a pair of items, wherein the pair of items comprises an anchor item and a similar item;
generating, using a similarity item model of a machine learning architecture, a prediction for a similar item, wherein the similarity item model combines outputs from a pair of separately trained machine learning models, wherein the pair of separately trained machine learning models comprise a gradient boosted model, wherein the gradient boosted model is trained using historical data comprising sparse features derived from item descriptions comprising data listed in a catalog over a period of time, wherein the pair of separately trained machine learning models further comprise a neural network model, and wherein the neural network model is trained using historical data comprising dense features comprising session activity data derived from user interaction data associated with respective items over the period of time;
combining a first output of the gradient boosted model and a second output of the neural network model to generate a similarity score for the pair of items;
generating categorical attribute embeddings based on the session activity data;
filtering the similarity score based on the categorical attribute embeddings, wherein the filtering comprises determining a distance value between a category of the similar item and a categorical attribute embedding of the similar item; and
based on a ranking of the similarity score, transmitting the similar item to a first position on a carousel display of a website that concurrently displays the anchor item on the website.

16. The non-transitory computer-readable medium of claim 15, wherein the operations further comprise:
using the gradient boosted model to determine the first output comprising a dense feature value; and
using the neural network model to determine the second output comprising a sparse feature value.

17. The non-transitory computer-readable medium of claim 15, wherein the operations further comprise:
implementing a respective hashing function for each respective type of training data used for a respective machine learning model; and
assigning each respective item a respective item identification (item_id) as respective input data for each respective type of the training data of the respective machine learning model.

18. The non-transitory computer-readable medium of claim 17, wherein the operations further comprise:

filtering the respective input data into respective subsets, wherein the respective subsets comprise respective anchor items and respective item pairs that are similar to the respective anchor items, and wherein each item_id of the respective item identification corresponds to one respective hash.

19. The non-transitory computer-readable medium of claim 17, wherein the operations further comprise:
   implementing inferencing in batches on each subset of data; and
   running the inferencing of each batch of the batches in parallel.

20. The non-transitory computer-readable medium of claim 17, wherein the operations further comprise:
   reducing a training size of the training data by splitting the training data based on a respective item_id of the respective item identification associated with each batch.

* * * * *